(12) United States Patent
Chou et al.

(10) Patent No.: US 11,320,647 B2
(45) Date of Patent: May 3, 2022

(54) METHODS AND APPARATUS FOR MODULATING LIGHT WITH PHASE CHANGE MATERIALS

(71) Applicant: Massachusetts Institute of Technology, Cambridge, MA (US)

(72) Inventors: Jeffrey Chou, Walnut Creek, CA (US); Vladimir Liberman, Reading, MA (US); Juejun Hu, Newton, MA (US); Yifei Zhang, Cambridge, MA (US); William Herzog, Bedford, MA (US); Jason Stewart, Stow, MA (US); Christopher Roberts, Amesbury, MI (US)

(73) Assignee: Massachusetts Institute of Technology, Cambridge, MA (US)

( * ) Notice: Subject to any disclaimer, the term of this patent is extended or adjusted under 35 U.S.C. 154(b) by 252 days.

(21) Appl. No.: 16/263,071

(22) Filed: Jan. 31, 2019

(65) Prior Publication Data
US 2019/0235228 A1    Aug. 1, 2019

Related U.S. Application Data

(60) Provisional application No. 62/624,335, filed on Jan. 31, 2018.

(51) Int. Cl.
*G02F 1/01* (2006.01)
*G02B 26/06* (2006.01)
(Continued)

(52) U.S. Cl.
CPC ............... *G02B 26/06* (2013.01); *G02B 5/20* (2013.01); *G02B 26/02* (2013.01); *G02B 27/0955* (2013.01)

(58) Field of Classification Search
CPC .......... G02B 5/20; G02B 26/06; G02B 26/02; G02B 27/0955; G02F 1/0126;
(Continued)

(56) References Cited

U.S. PATENT DOCUMENTS 6,177,166 B1    1/2001  Ohno et al.
6,858,277 B1    2/2005  Yamada et al.
(Continued)

FOREIGN PATENT DOCUMENTS

WO    2016123088 A1    8/2016

OTHER PUBLICATIONS

Barták et al. "Crystal growth kinetics and viscous behavior in Ge2Sb2Se5 undercooled melt." The Journal of Physical Chemistry B 120.32 (2016): 7998-8006.
(Continued)

*Primary Examiner* — Mahidere S Sahle
(74) *Attorney, Agent, or Firm* — Smith Baluch LLP

(57) ABSTRACT

Alloys of GeSbSeTe (GSST) can be used to make actively tunable infrared transmission filters that are small, fast, and solid-state. These filters can be used for hyperspectral imaging, 3D LIDAR, portable bio/chem sensing systems, thermal emission control, and tunable filters. GSST is a low-loss phase-change material that can switch from a low-index (n=3), amorphous state to a high-index (n=4.5), hexagonal state with low loss (k<0.3) over a wavelength range of 2-10 microns or more. The GSST thickness can be selected to provide pure phase modulation, pure amplitude modulation, or coupled phase and amplitude modulation. GSST can be switched thermally in an oven, optically with visible light, or electrically via Joule heating at speeds from kilohertz to Gigahertz. It operates with reversible and polarization independent transmission switching over a wide incident angle (e.g., 0-60 degrees).

20 Claims, 27 Drawing Sheets

(51) Int. Cl.
  *G02B 26/02* (2006.01)
  *G02B 5/20* (2006.01)
  *G02B 27/09* (2006.01)
(58) Field of Classification Search
  CPC .. G02F 1/0054; G02F 1/0147; G02F 2201/17;
    G02F 2202/10; G02F 2203/12; G02F
    2203/18; G02F 2203/06; G02F 2203/02;
    G02F 2203/055; G02F 2203/11
  USPC .................................................. 359/279, 288
  See application file for complete search history.

(56) References Cited

U.S. PATENT DOCUMENTS

| | | | |
|---|---|---|---|
| 7,136,559 | B2 | 11/2006 | Yusoff et al. |
| 2004/0027646 | A1 | 2/2004 | Miller et al. |
| 2007/0108430 | A1 | 5/2007 | Lung |
| 2007/0189053 | A1 | 8/2007 | Pellizzer et al. |
| 2007/0210348 | A1 | 9/2007 | Song et al. |
| 2008/0210924 | A1* | 9/2008 | Shin .................... H01L 45/1666 257/4 |
| 2009/0074652 | A1 | 3/2009 | Dussarrat |
| 2010/0193780 | A1* | 8/2010 | Smythe ................ H01L 45/148 257/42 |
| 2010/0226163 | A1 | 9/2010 | Savransky |
| 2011/0069540 | A1 | 3/2011 | Savransky |
| 2011/0273756 | A1 | 11/2011 | Wang et al. |
| 2012/0119181 | A1 | 5/2012 | Oh et al. |
| 2013/0037774 | A1 | 2/2013 | Song et al. |
| 2014/0203235 | A1 | 7/2014 | Lee et al. |
| 2015/0029775 | A1 | 1/2015 | Ravasio et al. |
| 2015/0378183 | A1 | 12/2015 | Pernice et al. |
| 2017/0366763 | A1* | 12/2017 | Lin ....................... G02F 1/1335 |
| 2018/0284492 | A1 | 10/2018 | Fang et al. |
| 2019/0109161 | A1* | 4/2019 | Goto ....................... G02B 1/11 |
| 2019/0235228 | A1 | 8/2019 | Chou et al. |
| 2019/0253776 | A1* | 8/2019 | Mazed .................. G02F 1/0147 |
| 2020/0096795 | A1* | 3/2020 | Bhaskaran ........... G02B 6/0051 |

OTHER PUBLICATIONS

Buller et al., "Influence of Partial Substitution of Te by Se and Ge by Sn on the Properties of the Blu-ray Phase-Change Material Ge8Sb2Te11," Chem. Mater. 2012, 24, 3582-3590, dx.doi.org/10.1021/cm301809g (Aug. 20, 2012).
Chao et al., "Multi-level phase change memory using slow-quench operation: GST vs. GSST." VLSI Technology, Systems, and Applications, 2009. VLSI-TSA'09. International Symposium on. IEEE, 2009. 2 pages.
Cheng et al., "Wave manipulation with designer dielectric metasurfaces." Optics letters 39.21 (2014): 6285-6288.
Chou et al., Electrically Switchable Transparent Phase Change Materials. Monday, Jul. 23, 2018 International Nano-Optoelectronics Workshop (INOW). 24 pages.
Chou et al., Phase-Change Metamaterials for Reconfigurable Imagers. Apr. 4, 2018. 38 pages.
Chou et al., Reconfigurable Transparent Phase Change Materials for Infrared Photonics. 2018 SPIE Photonics West Conference. Jan. 31, 2018. 25 pages.
Gholipour et al., "An all-optical, non-volatile, bidirectional, phase-change meta-switch." Advanced materials 25.22 (2013): 3050-3054. 5 pages.
Hegyi et al., "Hyperspectral imaging with a liquid crystal polarization interferometer." Optics express 23.22 (2015): 28742-28754.
Hosseini et al., "An optoelectronic framework enabled by low-dimensional phase-change films." Nature 511.7508 (2014): 206-211.
International Search Report and Written Opinion issued by the International Searching Authority for International Application No. PCT/US2018/25453, dated Aug. 8, 2018, 11 pages.

Koch et al., "Enhanced temperature stability and exceptionally high electrical contrast of selenium substituted Ge2Sb2Te5 phase change materials," RSC Adv., 2017, 7, 17164-17172 (Published on Mar. 20, 2017).
Koch et al., "Investigating the Influence of Resonant Bonding on the Optical Properties of Phase Change Materials (GeTe)xSnSb2Se4," Chem. Mater. 2017, 29, 9320-9327 (Oct. 4, 2017).
Lee et al., "Performances of GeSnSbTe material for high-speed phase change memory." VLSI Technology, Systems and Applications, 2007. VLSI-TSA 2007. International Symposium on. IEEE, 2007. 2 pages.
Lencer et al., "A map for phase-change materials." Nature Materials 7.12 (2008): 972-977.
Liberman et al., "Angle-and polarization-dependent collective excitation of plasmonic nanoarrays for surface enhanced infrared spectroscopy." Optics express 19.12 (2011): 11202-11212.
Matsunaga et al. "Structural analysis of GeSbTeSe phase-change materials." Libr E\PCOS 2009 (2009): 99-104.
Moriyama et al., "Small-sized Mach-Zehnder interferometer optical switch using thin film Ge2Sb2Te5 phase-change material." Optical Fiber Communication Conference. Optical Society of America, 2014. 3 pages.
Ríos et al., "Integrated all-photonic non-volatile multi-level memory." Nature Photonics 9.11 (2015): 725-732.
Ríos et al., "On-Chip Photonic Memory Elements Employing Phase-Change Materials." Advanced Materials 26.9 (2014): 1372-1377.
Rosenthal et al., 'Enhancing the Thermoelectric Properties of Germanium Antimony Tellurides by Substitution with Selenium in Compounds Ge_n Sb_2 (Te 1?xSe_x) n+3 (0 <= x<= 0.5; n >= 7)', Chemistry of Materials, vol. 26, Mar. 19, 2014 (Mar. 19, 2014), p. 2567-2578.
Rudé et al., "Active control of surface plasmon waveguides with a phase change material." ACS Photonics 2.6 (2015): 669-674.
Rudé et al., "Optical switching at 1.55 μm in silicon racetrack resonators using phase change materials." Applied Physics Letters 103.14 (2013): 141119. 5 pages.
Shportko et al., "Resonant bonding in crystalline phase-change materials." Nature materials 7.8 (2008): 653-658.
Siegel et al., "Rewritable phase-change optical recording in Ge 2 Sb 2 Te 5 films induced by picosecond laser pulses." Applied physics letters 84.13 (2004): 2250-2252.
Soref, "Phase-change materials for Group-IV electro-optical switching and modulation." Group IV Photonics (GFP), 2015 IEEE 12th International Conference on. IEEE, 2015. 2 pages.
Stegmaier et al., "Thermo-optical effect in phase-change nanophotonics." ACS Photonics 3.5 (2016): 828-835.
Svoboda et al., "Amorphous-to-crystalline transition in Te-doped Ge2Sb2Se5 glass." Journal of Thermal Analysis and Calorimetry 117.3 (2014): 1073-1083.
Svoboda et al., "Thermal behavior of Se-rich GeSb2Se(4-y)Tey (glassy) system," Journal of Alloys and Compounds 670 (2016) 222-228 (Available online Feb. 9, 2016).
Vinod et al., 'Structural transition and enhanced phase transition properties of Se doped Ge2Sb2Te5 alloys', Scientific Reports, vol. 5, article 8050, Jan. 30, 2015 (Jan. 30, 2015), p. 1-7.
Wang et al., "Optically reconfigurable metasurfaces and photonic devices based on phase change materials." Nature Photonics 10.1 (2016): 60-65.
Werner et al., "Adaptive phase change metamaterials for infrared aperture control." Unconventional Imaging, Wavefront Sensing, and Adaptive Coded Aperture Imaging and Non-Imaging Sensor Systems. vol. 8165. International Society for Optics and Photonics, 2011. 10 pages.
Zhang et al., "Broadband transparent optical phase change materials." CLEO: Applications and Technology. Optical Society of America, 2017. 2 pages.
Wuttig et al., "Phase-change materials for non-volatile photonic applications." Nature Photonics 11.8 (2017): 465. 12 pages.
Wuttig et al., "Phase-change materials for rewriteable data storage." Nature materials 6.11 (2007): 824. 10 pages.

(56) References Cited

OTHER PUBLICATIONS

Zhang et al., "Broadband nonvolatile photonicswitching based on optical phase change materials: beyond the classical figure-of-merit," Optics Letters, vol. 43, No. 1, 4 pp. (Jan. 1, 2018). 4 pages.
Zhang et al. "Extreme Broadband Transparent Optical Phase Change Materials for High-Performance Nonvolatile Photonics." arXiv preprint arXiv: 1811.00526 (Nov. 1, 2018). 16 pages.
Michels et al., "Optical probe for nondestructive wafer-scale characterization of photonic elements." IEEE Photonics Technology Letters 29.8 (2017): 643-646.
Taboada et al., "Thermo-optically tuned cascaded polymer waveguide taps." Applied physics letters 75.2 (1999): 163-165.
Topley et al., "Locally erasable couplers for optical device testing in silicon on insulator." Journal of Lightwave Technology 32.12 (2014): 2248-2253.
Topley et al., "Planar surface implanted diffractive grating couplers in SOL" Optics Express 22.1 (2014): 1077-1084.
International Search Report and Written Opinion in International Patent Application No. PCT/US19/15964 dated Jun. 3, 2019, 15 pages.

\* cited by examiner

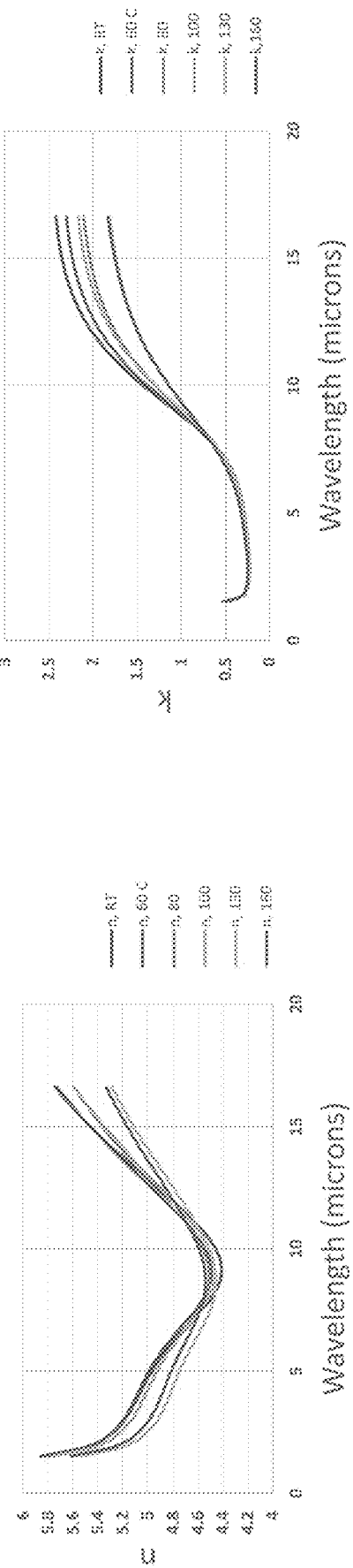
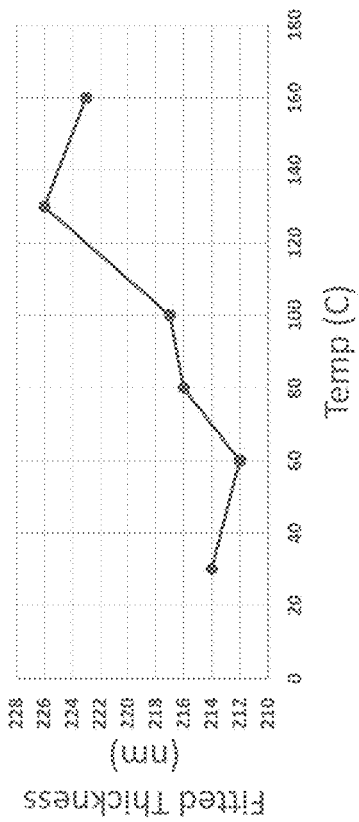
FIG. 1E
FIG. 1F
FIG. 1D

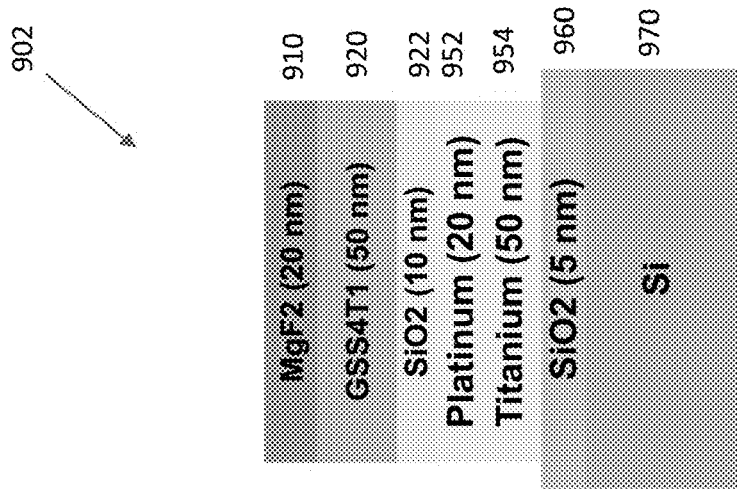
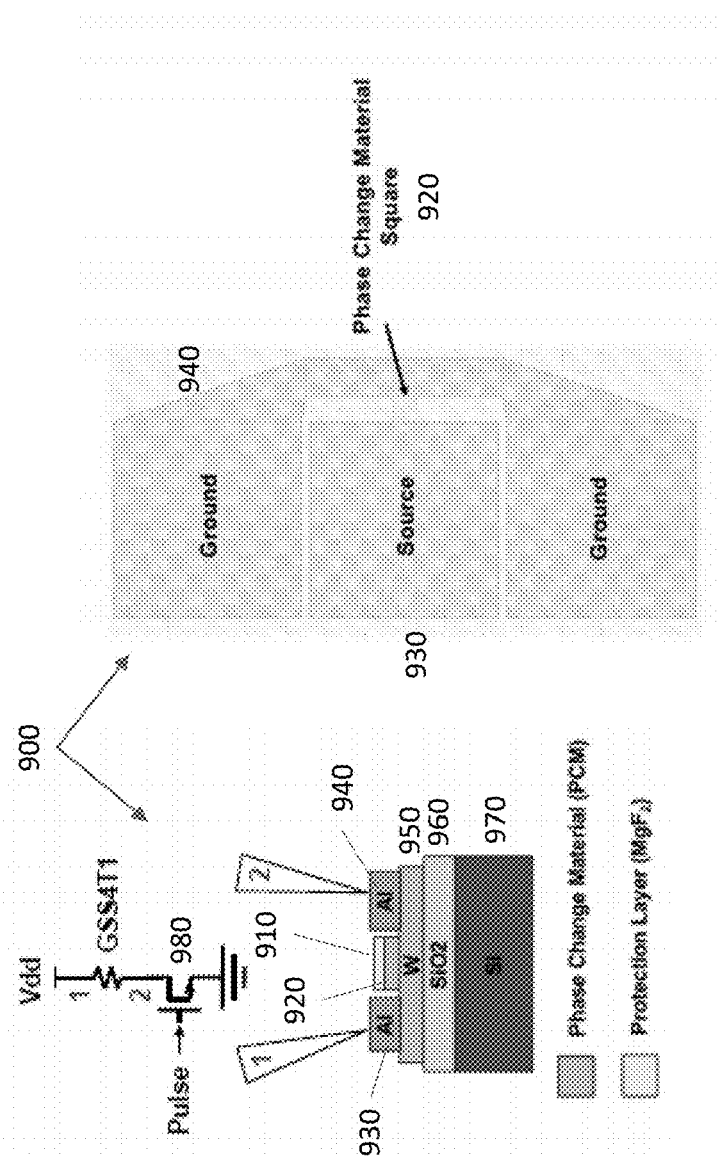
FIG. 9A  FIG. 9B  FIG. 9C

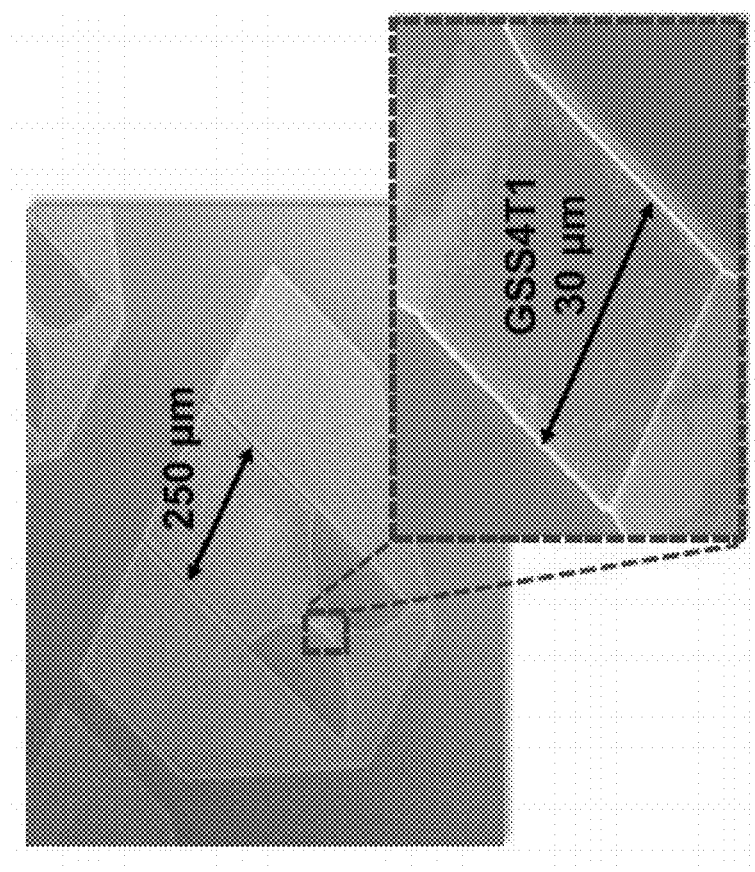
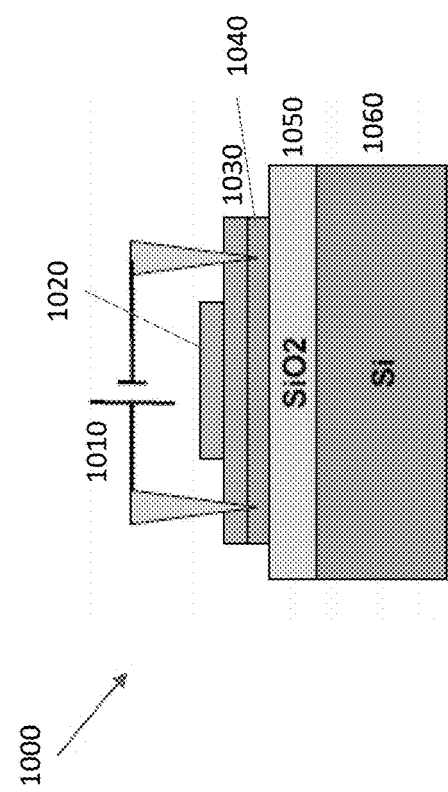
FIG. 10B
FIG. 10A

METHODS AND APPARATUS FOR MODULATING LIGHT WITH PHASE CHANGE MATERIALS

CROSS-REFERENCE TO RELATED APPLICATION(S)

This application claims the priority benefit, under 35 U.S.C. § 119(e), of U.S. Application No. 62/624,335, filed on Jan. 31, 2018, and entitled "Reconfigurable Infrared Flat Optics with Phase Change Materials," which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Spatial light modulators (SLMs) are widely used in digital projectors, beam steering, and optical signal processing applications for consumer, industrial, scientific, and government applications. An SLM modulates the amplitude or phase of transmitted or reflected light across a spatial dimension. Typically, an SLM modulate light across a 2D spatial plane, such as in a digital projector.

The two main types of SLMs are liquid crystal or microelectro mechanical systems (MEMS) SLMs. The problem with both techniques is they are slow (e.g., switching rates of less than 10 kHz) and they have large pixel sizes (e.g., >300 µm). Further, the MEMS tip tilt mirrors are only binary in operation, so intermediate (analog or multi-bit digital) amplitude control is not possible. These drawbacks fundamentally limit current SLMs' ability to perform dynamic beam forming or act as adaptive optics.

Other types of filters, called tunable spectral filters, modulate the wavelength of incident light. Tunable spectral filters are used in hyperspectral imaging, chemical sensing, spatial light modulation, 3D LIDAR, thermal emission control, and laser filtering. For many compact optical systems, physical space is highly constrained which requires small form factor components. Traditional tunable filters use bulky mechanical filter wheels which are too large and unstable for compact or high vibration systems. Other solutions such as micro-electro mechanical systems often require small fill factors and complex fabrication that often work in reflection mode.

SUMMARY

Optical phase change materials (O-PCMs), a unique group of materials featuring drastic optical property contrast upon solid-state phase transition, can be used to modulate the phase, amplitude, and/or wavelength of incident light. O-PCMs have found widespread adoption in photonic switches and routers, reconfigurable meta-optics, reflective display, and optical neuromorphic computers. As explained below, O-PCMs can also be used to make thin, solid-state tunable filters which can tune their transmitted spectral properties on demand.

These O-PCMs are based on a new class of materials. Current O-PCMs, such as $Ge_2Sb_2Te_5$ (GST), exhibit large contrast of both refractive index ($\Delta n$) and optical loss ($\Delta k$), simultaneously. The coupling of both optical properties in GST fundamentally limits the function and performance of GST SLMs in many potential applications. Fortunately, new O-PCMs, including different alloys of GeSbSeTe (GSST), GeSbSe, and SbSe, can be tuned independently in refractive index and attenuation. They can also be tuned quickly, meaning that a GSST device can potentially switch at GHz frequencies, have pixel sizes down to 0.1 µm, and can achieve intermediate amplitude and phase responses. Further, the fabrication of phase-change pixels is significantly less complex than MEMS fabrication processes, since it is a simple thin film, room-temperature deposition.

The new O-PCMs enable new methods and apparatus, including a method of spatially modulating infrared light that comprises programming a GSST element with a spatially modulated refractive index and/or an absorption and spatially modulating a phase and/or intensity of a beam of infrared light with the spatially modulated refractive index and/or an absorption of the GSST element. Programming the GSST element with the spatially modulated refractive index and/or an absorption may include illuminating the GSST element with a beam of visible light that switches the GSST element between an amorphous state and a crystalline state. This beam of visible light may itself be spatially modulated. Alternatively, the GSST element can be programmed by heating to a temperature above or below a phase change temperature of GSST. This can be accomplished by heating the GSST element with a conductive layer heated by a current. If desired, the spatially modulated refractive index and/or absorption programmed into the GSST element can be erased, and the GSST element can be programmed with another spatially modulated refractive index and/or absorption.

GSST and other O-PCMs can be used to make spatial light modulators (SLMs). An example SLM includes a resistive layer, a GSST element in thermal communication with the resistive layer, and a pair of electrodes in electrical communication with the resistive layer. In operation, the electrodes apply a current pulse to the resistive layer, which heats the GSST element, thereby causing a reversible change in the GSST's refractive index and/or absorption.

The GSST element's thickness may be selected to produce a change in refractive index and/or a change in absorption in response to heating by the resistive layer. For example, the GSST element can change at least partially from a crystalline state to an amorphous state or vice versa in response to heating by the heater.

The GSST element may be a first GSST element in an array of GSST elements, each of which is in thermal communication with a corresponding portion of the resistive layer. In this case, the resistive layer may be patterned to thermally isolate the corresponding portions of the resistive layer. The GSST elements in the array may have different thicknesses (e.g., the first GSST element may have a first thickness and a second GSST element may have a second thickness different than the first thickness).

The SLM may also include a transistor, in electrical communication with one electrode in the pair of electrodes, to provide the current pulse to the pair of electrodes. It can also include a focal plane array, in optical communication with the GSST element, to detect light modulated by the GSST element. And it may include a controller, in operably coupled to the focal plane array, to modulate the current pulse based on the light detected by the focal plane array. For instance, the controller may modulate the current pulse at a rate of at least 1 kHz, in which case the GSST element can produce a phase shift of up to about $\lambda/10$, where $\lambda$ is a wavelength of light incident on the GSST element.

An electrically switched GSST element can be used to spatially modulate infrared light by applying a current pulse to a resistive element in thermal communication with the GSST. The resistive element heats the GSST element, thereby changing a refractive index and/or an absorption of the GSST element (e.g., by causing the GSST element to transition between an amorphous state and a crystalline state). Transmitting the infrared light through the GSST element changes a phase and/or an intensity of the infrared light.

Another O-PCM SLM comprises many layers, including: a silicon substrate; a first silicon dioxide layer disposed on the silicon substrate; a titanium layer disposed on the first silicon dioxide layer; a platinum layer nm disposed on the titanium layer; a second silicon dioxide layer disposed on the platinum layer; a GSS4T1 layer having a thickness of between about 5 nm and about 200 nm disposed on the second silicon dioxide layer; and a magnesium fluoride layer having a thickness of about 20 nm disposed on the GSS4T1 layer.

Multi-layer SLMs are also possible. For instance, an SLM with independent phase and amplitude control may include a first GSST layer, whose refractive index varies reversibly with temperature, that modulates a phase of an incident beam of infrared light and a second GSST layer, in optical communication with the first GSST layer and whose absorption varies reversibly with temperature, to modulate an intensity of the incident beam of infrared light.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1D shows the refractive index versus wavelength for GSS4T1 at different temperatures.

FIG. 1E shows the extinction coefficient versus wavelength for GSS4T1 at different temperatures.

FIG. 1F is a plot of fitted film thickness versus temperature for GSS4T1.

FIG. 9A is a profile view of an electrically switched PCM modulator with a tungsten layer for Joule heating.

FIG. 9B is a plan view of the electrically switched PCM modulator of FIG. 9A.

FIG. 9C is a profile view of an electrically switched PCM modulator with a titanium/platinum layer for Joule heating.

FIG. 10A shows a profile view of an alternative electrically switched PCM modulator.

FIG. 10B shows micrographs of the alternative electrically switched PCM modulator of FIG. 10A.

DETAILED DESCRIPTION

Ge—Sb—Se—Te (GSST) is a new type of optical phase change material (O-PCM) that can be used to modulate phase, amplitude, or both phase and amplitude. GSST breaks the traditional coupling between phase and amplitude modulation as demonstrated with an optical figure of merit improvement of more than two orders of magnitude. A computationally optimized alloy of GSST, $Ge_2Sb_2Se_4Te_1$ (GSS4T1), combines broadband low optical loss (1-18.5 µm), large optical contrast (Δn=2.0), and significantly improved glass forming ability, enabling an entirely new class of infrared and thermal photonic devices. GSST and similar phase change materials can be switched thermally, optically, and electrically. They can be used to make nonvolatile integrated optical switches with record low loss and large contrast ratio as well as electrically addressed, microsecond-switched pixel-level spatial light modulators (SLMs).

GSST shows enormous promise as a platform material for scalable nonvolatile photonics. For instance, adaptive optics, beam steering for LIDAR self-driving car applications, hologram projections, optical computing for machine learning, and image processing for commercial and government applications would all benefit from a solid-state SLM. One of the largest application spaces is beam steering, which is used through the defense and commercial world. Since arbitrary diffractive optical elements can be created, complex beam profiles can be arbitrarily achieved, including 1-to-N beams, image projection, and polarization filters.

Another application is long wave infrared (LWIR) spatial light modulation. Currently there are no LWIR SLMs. Commercial MEMS based systems are not designed for long wavelengths and thus come with large diffraction issues. GSST alloys, on the other hand, can modulate light across the entire IR spectrum. An IR SLM could be used for chemical sensing, bio-imaging, and optical communication, among other things.

Optical Phase Change Material (O-PCM) Characterization

Figures 1A, 1B:
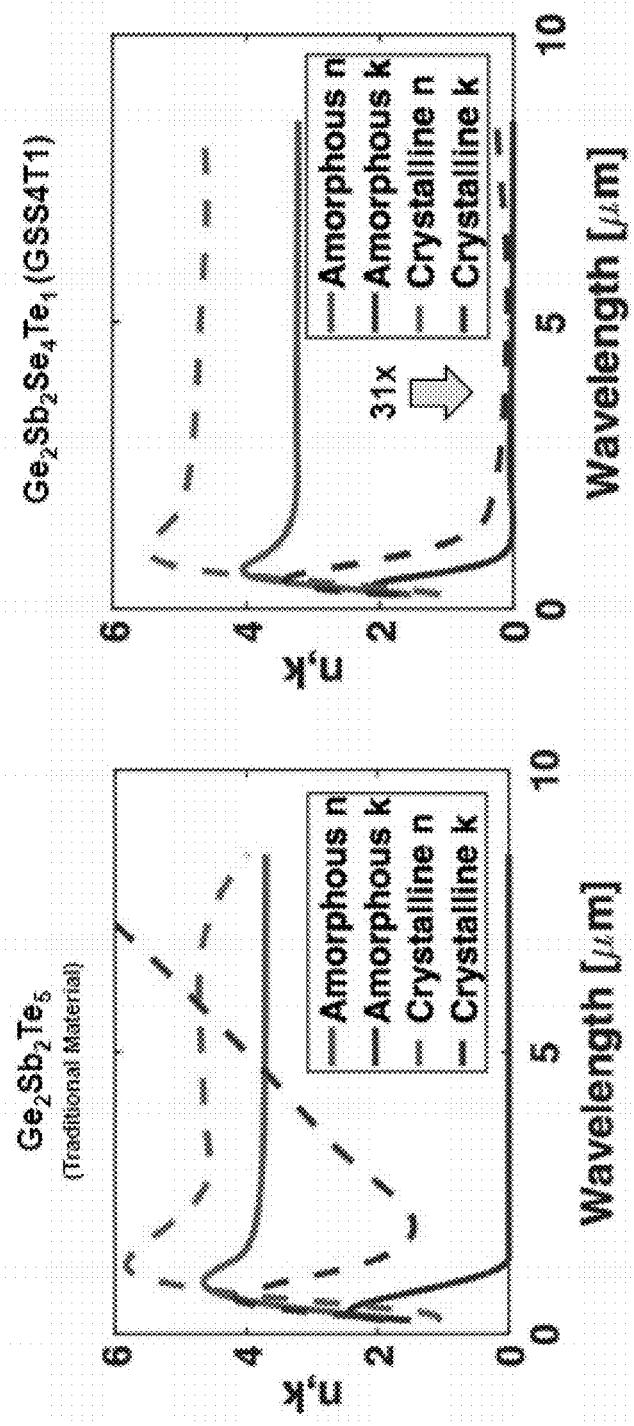
FIG. 1A is a plot of the coefficients for complex index of refraction of $Ge_2Sb_2Te_5$ (GST) versus wavelength.
FIG. 1B is a plot of the coefficients for complex index of refraction of $Ge_2Sb_2Se_4Te_1$ (GSS4T1) versus wavelength.

FIGS. 1A and 1B show measured refractive indices of GST and GSS4T1, respectively. The phase change materials were deposited on $CaF_2$ substrates that were 1 cm in diameter via flash evaporation. Optical constants were obtained by combining measurements from UV-NIR ellipsometry, near-IR, and Fourier Transform IR (FTIR) measurement systems to span the UV to long-wave IR spectrum. Each O-PCM was thermally switched via a furnace at 350° C. for 30 minutes in a nitrogen environment. The results in FIG. 1A show free carrier absorption for the hexagonal (crystalline) state of GST films via the increasing k value as a function of wavelength. This result is consistent with the electrical properties of crystalline GST. FIG. 1B shows low values of k for both the amorphous and hexagonal states of GSS4T1 throughout the midwave and longwave portions of the IR spectrum. The measurements were limited via the absorption edge of the CaF2 substrate which begins to absorb at wavelengths above 9 µm. Because of the lack of free carriers, the crystalline state of GSS4T1 is not electrically conductive. Due to the high refractive index of the GSS4T1, angle dependence is significantly reduced due to Snell's law.

Figure 1C:
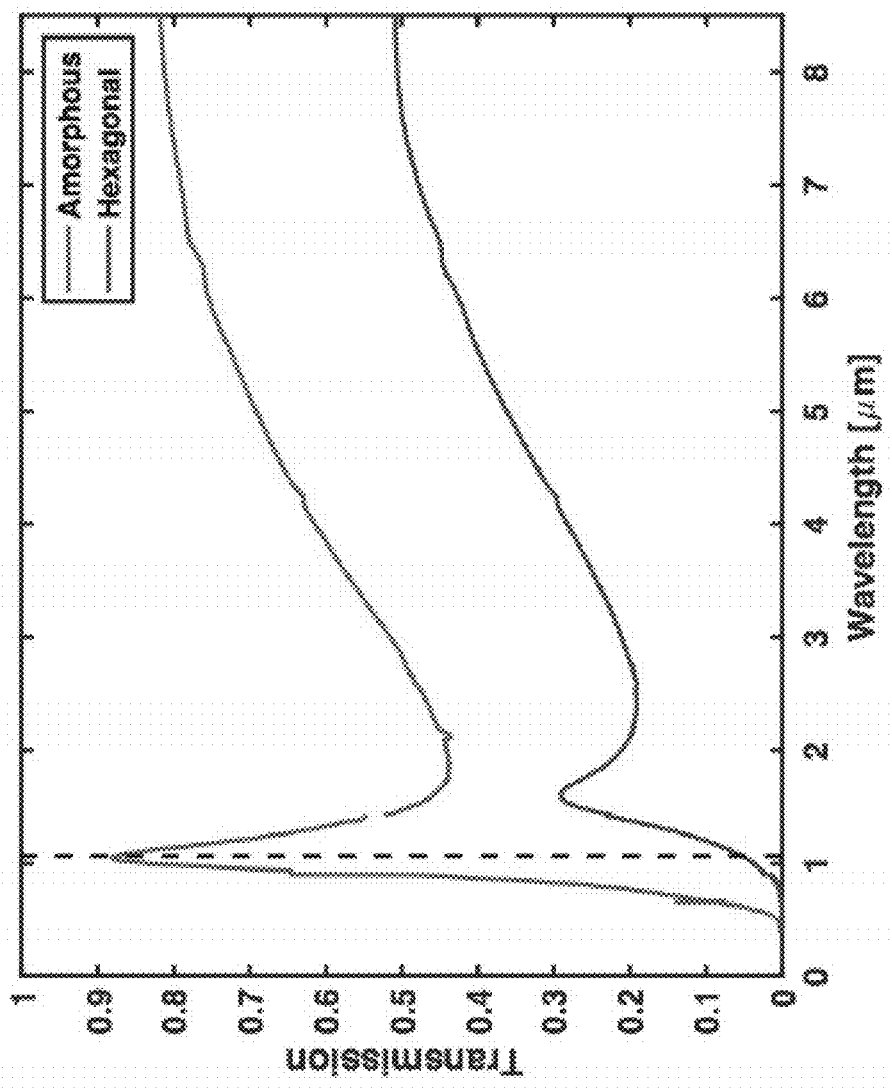
FIG. 1C shows the measured transmission spectrum of the 150 nm thick, un-patterned GSS4T1 film from the visible to the IR regions of the electromagnetic spectrum.

FIG. 1C shows the measured transmission spectrum of the 150 nm thick, un-patterned GSS4T1 film from the visible to the IR regions of the electromagnetic spectrum. Due to the high refractive index of the film, a Fabry-Pérot resonance is observed at a wavelength of 1064 nm in the amorphous state with a transmission of 88%. The resonant wavelength's sensitivity to incident angle is also significantly mitigated due to the high index of the film: a resonance wavelength shift of less than 10 nm at a 30° incident angle is obtained. This angular insensitivity is important for imaging applications at higher numerical apertures. In the hexagonal state, the transmission at 1064 nm reduces to 5%, which shows a resonance enhanced switching contrast of 12.4 dB. The shift of the peak's resonant wavelength also demonstrates the change in the refractive index and agrees with simulations.

FIGS. 1D-1F illustrate the optical properties of a GSST film with an as-deposited thickness of about 214 nm at room temperature versus temperature. FIGS. 1D and 1E show how the refractive index n and extinction coefficient k as it goes from an as-deposited state at room temperature (RT) to a temperature of about 160° C. At this temperature, the GSST is hotter but not crystallized—it remains in an amorphous state. FIG. 1F shows how the thickness of the GSST film changes versus temperature. The data shown in FIGS. 1D-1F illustrate GSST's change in refractive index with temperature (the "dn/dT effect"), or how the optical properties change with temperature, at temperatures below when the phase transition temperature. Each of the O-PCM devices described below can be modulated (or modified to modulated) at temperatures below when the phase transition temperature to provide vary fast amplitude and/or phase modulation because "dn/dT" effects are almost instantaneous.

O-PCM Switchable Resonators and Spectral Filters

FIGS. 2A-2F illustrate resonators and spectral filters made using different types of O-PCMs, including different alloys of GSST. In each device, switching the O-PCM between a crystalline state and an amorphous state changes the device's optical properties, including its optical thickness and transmittivity/reflectivity, making it possible to modulate the wave front of an incident beam of light. The exact change(s) in the device's optical properties depend on the composition and thickness of the O-PCM layer as well as the device's structure.

Figures 2A, 2B:
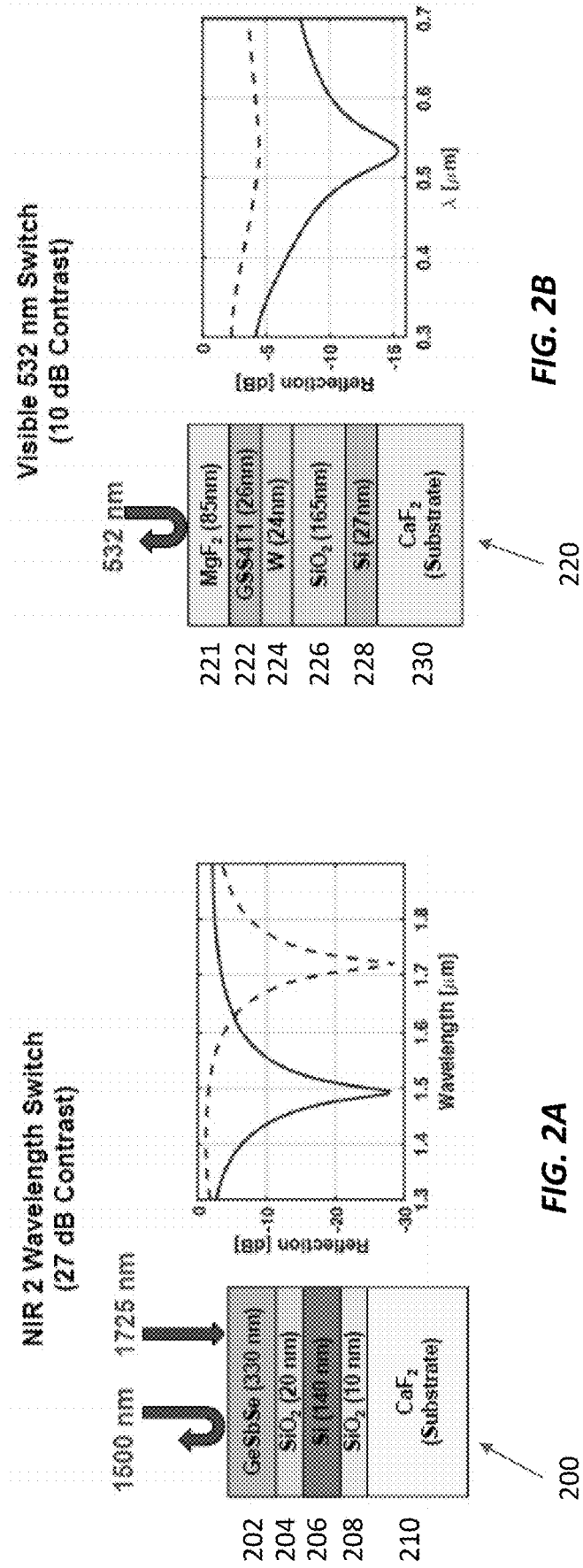
FIG. 2A illustrates a near-infrared (NIR), two-wavelength PCM switch with 27 dB contrast.
FIG. 2B illustrates a visible-light PCM switch with 10 dB contrast.

FIG. 2A shows a two-wavelength reflective switch 200 with a 330 nm layer 202 of GeSbSe (GSS) O-PCM. The O-PCM layer 202 is on a 140 nm layer 206 of silicon sandwiched between a 20 nm silicon dioxide layer 204 and a 10 nm silicon dioxide layer 208, which in turn are on a calcium fluoride substrate 210. Switching the O-PCM layer 202 between amorphous (solid line) and (hexagonal) crystalline states (dashed line) shifts the switch's reflection resonance as shown in the simulation at right. In one state, the switch 200 reflects light at 1500 nm but not at 1725 nm; in the other state, the switch 200 reflects light at 1725 nm but not at 1500 nm. The contrast between the two states is about 27 dB.

FIG. 2B shows a reflective switch 220 with a 26 nm layer 222 of GSS4T1 O-PCM. The O-PCM layer 222 is coated with an 85 nm magnesium fluoride layer 221 and is on a multi-layer stack that includes a 24 nm tungsten layer 224, a 165 nm silicon dioxide layer 226, and a 27 nm silicon layer 228 on a calcium fluoride substrate 230. Running a current through the tungsten layer 224 causes the tungsten layer 224 to increase in temperature. This heats the O-PCM layer 222. When the O-PCM layer 222 gets hot enough, it switches between amorphous (solid line) and (hexagonal) crystalline (dashed line) states, changing the device from a fully reflective state to a state in which the device 220 does not fully reflect incident light at 532 nm. This change is due to a simultaneous change in the n (refractive index) and k (extinction ratio) coefficients of the O-PCM layer's complex refractive index. The magnitude of this reflection suppression at 532 nm is about 10 dB as shown in the plot at right of the device's reflection spectrum.

Figure 2C:
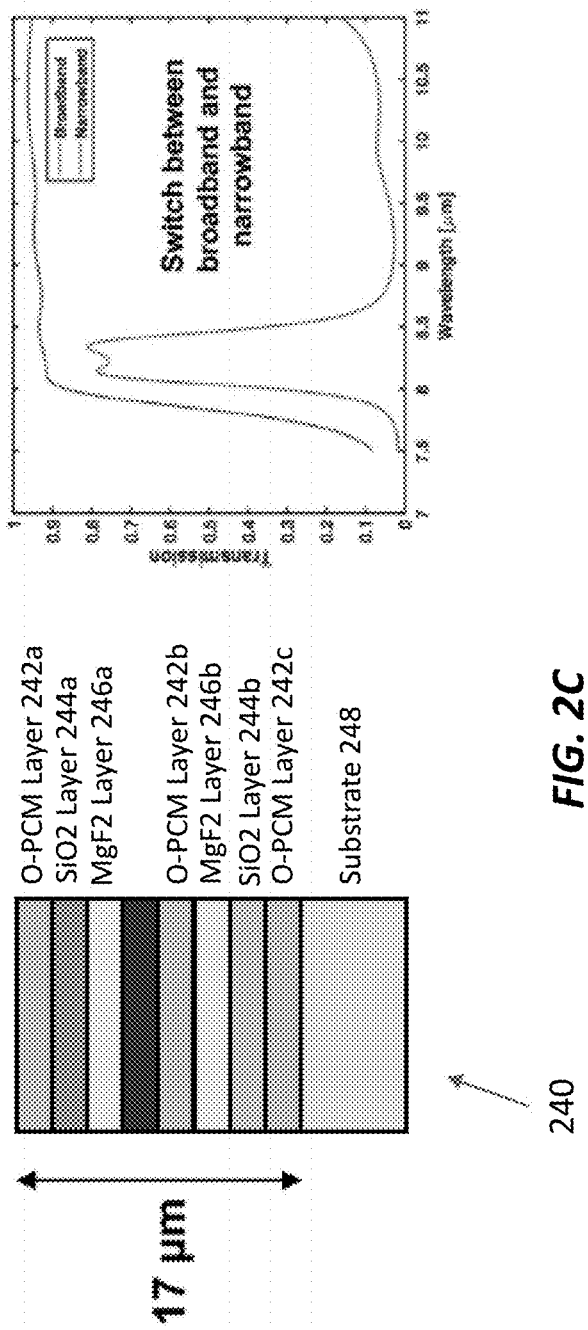
FIG. 2C illustrates a tunable PCM spectral filter.

FIG. 2C shows a tunable spectral filter 240 with a layer of O-PCM. It includes several O-PCM layers 242a-242c with interleaved SiO$_2$ layers 244a and 244b and MgF$_2$ layers 246a and 246b on a substrate 248. The O-PCM layers 242a-242c could be switched electrically with very thin graphene heaters (not shown) in between the layers. Switching the O-PCM between amorphous and crystalline states causes the filter 240 to switch between broadband transmission and narrowband transmission as shown in the transmission spectrum plot at right. Broadband transmission is extremely broad—the plot shows transmission over a wavelength band extending from about 8 μm to over 11 μm.

Figure 2F:
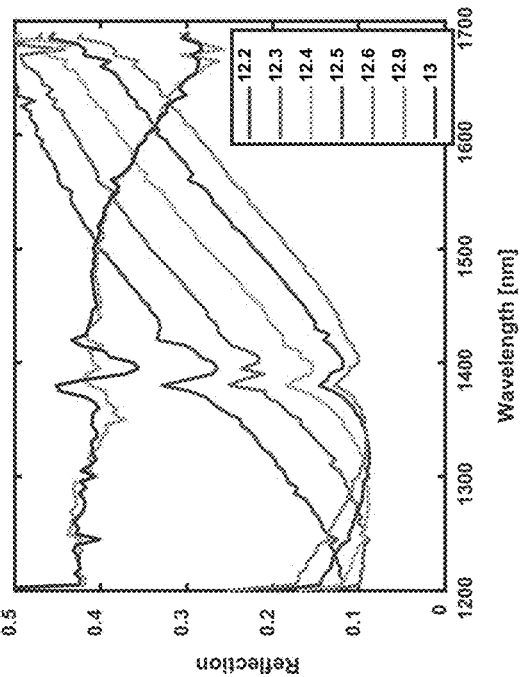
FIG. 2F is a plot of measured reflection spectra of the thermally switched PCM modulator of FIG. 2D after various voltage pulses (the legend shows the value of the peak voltage).
Figure 2E:
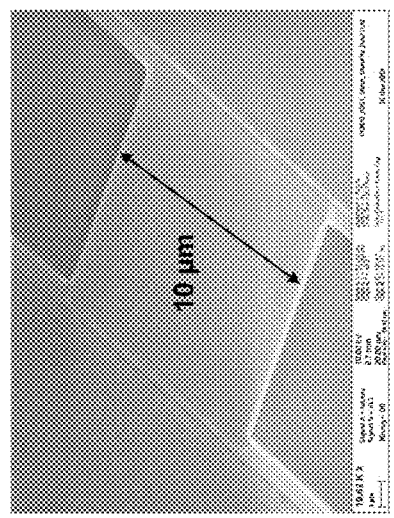
FIG. 2E is a micrograph of the thermally switched PCM modulator of FIG. 2D.
Figure 2D:
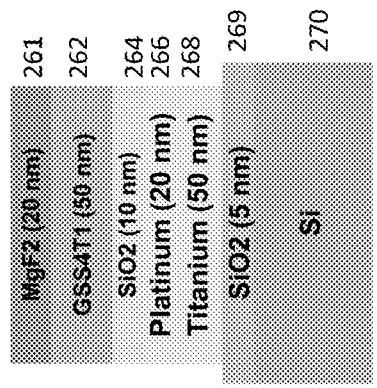
FIG. 2D is a profile view of a thermally switched PCM modulator.

FIGS. 2D-2F illustrate a thin-film stack 260 optimized for modulating broadband IR light. FIG. 2D shows a cross-sectional schematic of the thin-film stack 260, which includes a 20 nm magnesium fluoride layer 261, a 50 nm layer 262 of GSS4T1, a 10 nm silicon dioxide layer 264, a 20 nm platinum layer 266, a 50 nm titanium layer 268, and a 5 nm silicon dioxide layer 269 on a silicon substrate 270. The thin-film stack 260 forms a 10 μm square O-PCM pixel as shown in the scanning electrode microscope (SEM) image in FIG. 2E. (Many O-PCM pixels can be integrated into a single O-PCM SLM.)

FIG. 2F shows the reflection spectra over a wavelength band extending from 1200 nm to 1500 nm for the pixel (thin-film stack 260) in FIG. 2E. In this case, the pixel is switched electrically by running a current through the platinum layer 266 and titanium layer 268 as described below. Each trace in FIG. 2F is for a different voltage across the pixel (the legend shows the value of the peak voltage). These reflection spectra show that the pixel's wavelength-dependent reflection varies as a function of applied voltage, making the pixel suitable for the spectrometer application described below with respect to FIGS. 17A and 17B.

The O-PCM devices in FIGS. 2A-2E are just examples; devices with other geometries and materials are also possible. For instance, the O-PCM can have a thickness between 0 nm and 200 nm (e.g., 25 nm, 50 nm, 75 nm, 100 nm, 125 nm, 150 nm, or 175 nm) depending on the desired modulation and the number, thicknesses, and compositions of the other layers in the device. Thicker O-PCM layers are also possible, although they may not cool (dissipate heat) as quickly and therefore may not switch as quickly as thinner O-PCM layers. If the O-PCM is large enough, it may have a non-uniform thickness, e.g., it may be wedged or rippled to provide a spatially varying response to a constant switching voltage. A single device may also include O-PCM pixels of different thicknesses and/or shapes.

Likewise, an O-PCM device may have any of wide range of substrates, including thermally conductive substrates like silicon or visibly transparent substrates like glass or sapphire. The substrate shape, thickness, and optical properties may be selected to meet desired optical, thermal, and/or mechanical constraints.

The O-PCM layer can be formed as large, uniform layer or it can be pixelated at a pitch down to about 100 nm and fill factors approaching 99%, depending in part on the pixel switching mechanism. At higher fill factors, the pixels may be switched in temporally multiplexed fashion or in groups to allow heat dissipation between actuations.

Figures 3A, 3B:
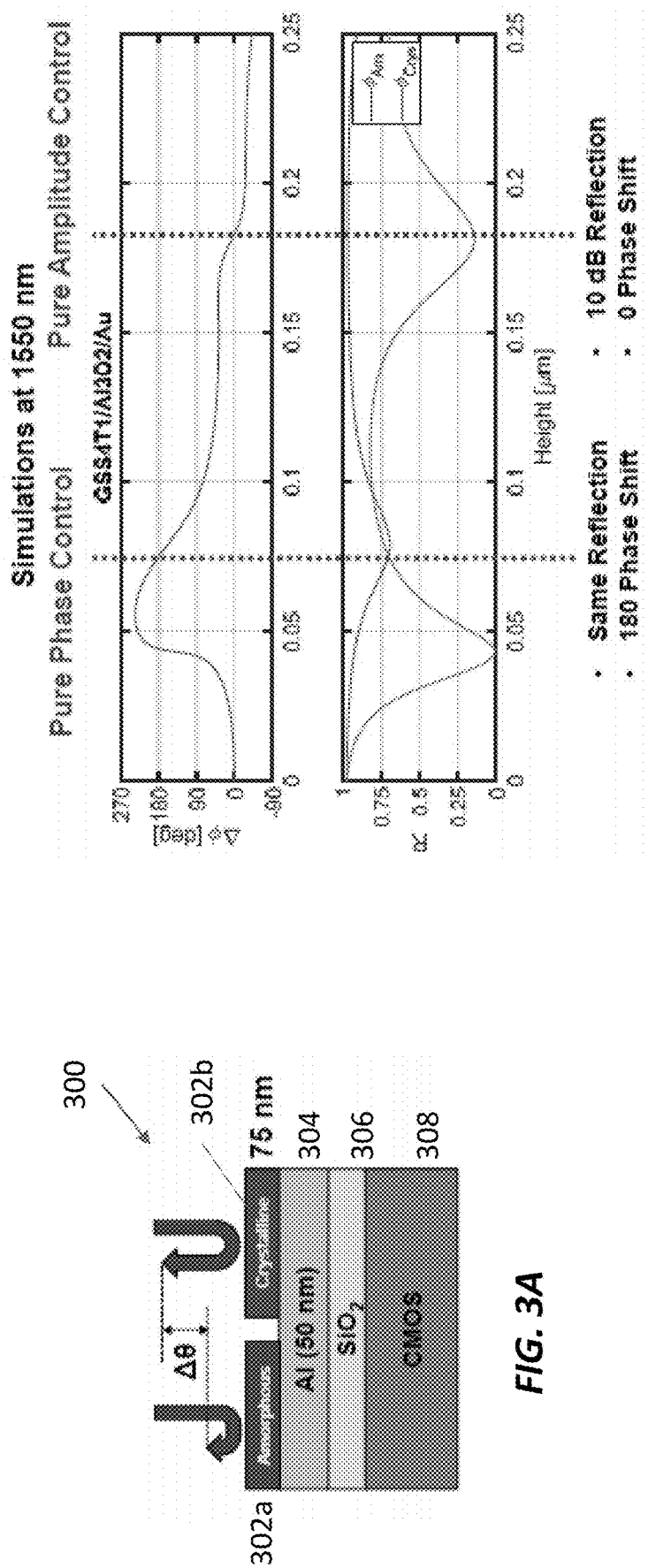
FIG. 3A shows a reflective GSS4T1 modulator with subwavelength pixels than can be used to modulate the phase of an incident beam of light.
FIG. 3B illustrates phase change (upper plot) and reflectivity (lower plot) as a function of GSS4T1 thickness in the modulator of FIG. 2A

FIGS. 3A and 3B illustrate how an O-PCM device can operate as a pure phase modulator, a pure amplitude modulator, or a combination phase/amplitude modulator. FIG. 3A shows an O-PCM device 300 shows a first O-PCM pixel 302a next to a second O-PCM pixel 302b on a 50 nm thick reflective aluminum layer 304, which in turn is on a silicon dioxide buffer layer 306 on a CMOS chip 308. The first O-PCM pixel 302a and second O-PCM pixel 302b each have a physical thickness of 75 nm, but different optical thicknesses because the first O-PCM pixel 302a is in a lower-index amorphous state and the second O-PCM pixel 302b is in higher-index crystalline state. Because the pixels 302a and 302b have different optical thicknesses, they impart a spatially varying relative phase difference Δθ across the reflected beam, illustrated by the arrows of different lengths. This phase difference can be manipulated by switching the pixels 302a and 302b between states to steer or other spatially modulate the reflected beam.

The nature of the spatial modulation imparted by the O-PCM device 300 depends in part on the thickness, refractive index, and extinction ratio of the O-PCM layer. For instance, a 75 nm thick layer of GSS4T1 on an aluminum oxide and gold stack can be modulated to produce a phase change of 180° for a negligible change in reflectivity. This is shown by the left-hand dashed vertical line running through the phase (top) and reflectivity (bottom) plots in FIG. 3B. In contrast, a GSS4T1 layer that is about 175 nm thick can be switched between a reflective state and a less reflective state with a contrast ratio of about 10 dB without a noticeable phase change as indicated by the righthand dashed vertical line in FIG. 3B. At other GSS4T1 thicknesses, the device 300 can be actuated to produce a combination of phase and amplitude modulation as shown in FIG. 3B.

Figure 3C:
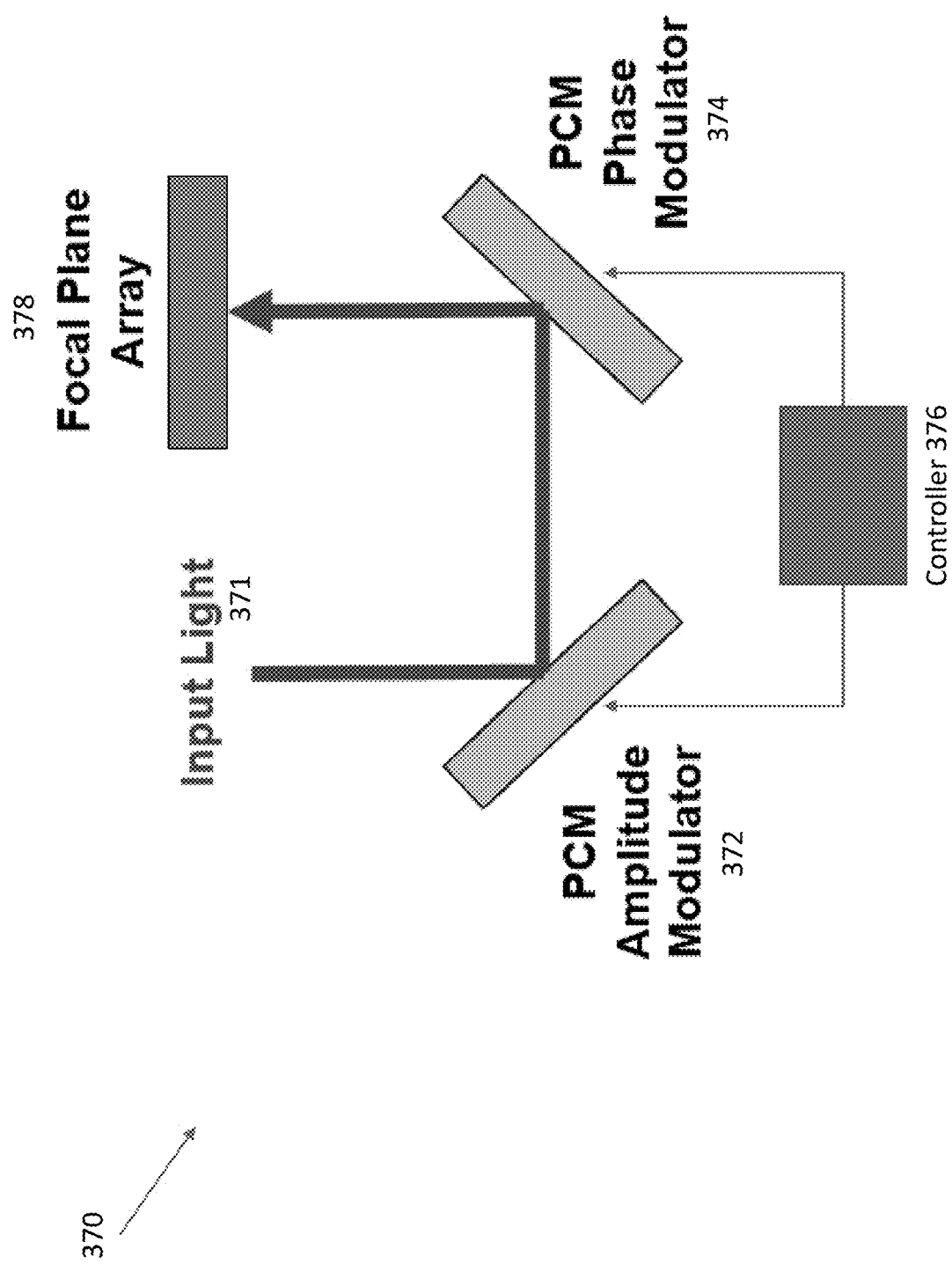
FIG. 3C shows an O-PCM SLM with independent phase and amplitude control provided by a reflective O-PCM phase modulator and a reflective O-PCM amplitude modulator, respectively.

FIG. 3C shows an O-PCM SLM system 370 that provides independently controllable phase and amplitude modulation. The system 370 includes an O-PCM reflective amplitude modulator 372 and an O-PCM reflective phase modulator 374 coupled to a controller 376, which may also be connected to an optional focal plane array 378. The O-PCM reflective amplitude modulator 372 may be formed of pixelated O-PCM material with a thickness selected to produce pure amplitude modulation at the system's operating wavelength (e.g., 175 nm thick GSS4T1 for an operating wavelength of 1550 nm). Similarly, the O-PCM reflective amplitude modulator 374 may be formed of pixelated O-PCM material with a thickness selected to produce pure phase modulation at the system's operating wavelength (e.g., 75 nm thick GSS4T1 for an operating wavelength of 1550 nm). In each device, the O-PCM material is on a reflective substrate or a substrate coated with a reflective layer and is modulated optically or electrically as disclosed below.

In operation, incident light 371 reflects off the O-PCM reflective amplitude modulator 372 with a spatial amplitude modulation set by the controller 376. The spatially amplitude-modulated beam reflects off the O-PCM reflective phase modulator 374 with a spatial phase modulation set by the controller 378 and is detected by the focal plane array 378. In other implementations, the O-PCM reflective amplitude modulator 372 and O-PCM reflective phase modulator 374 are reversed so that the incident light 371 is spatially modulated in phase, then amplitude. Other versions of the system 700 may include additional components, such as mirrors or lenses, and additional O-PCM phase and amplitude modulators.

The thin-film stacks and spectra shown in FIGS. 2A-2F, 3A, and 3B are just examples of what is possible with GSST alloys and other O-PCM materials. By varying the number, thickness, and/or composition of the layers in a thin-film stack, it is possible to set the stack's optical properties as a function of the O-PCM state. For example, the phase change effect can be designed to turn on and off various reflection or transmission resonances. The resonances can be made broader or narrower and/or shifted to certain wavelengths. The O-PCM thickness can be selected for pure phase control, pure amplitude control, independent control of phase and amplitude, or coupled control of phase and amplitude. Likewise, the pixels can be made larger or smaller, including even smaller than the diffraction-limited spot size of the beam being modulated (e.g., with lateral dimensions of less than 1 μm).

Thermally Switched O-PCM Metasurfaces

Figure 4B:
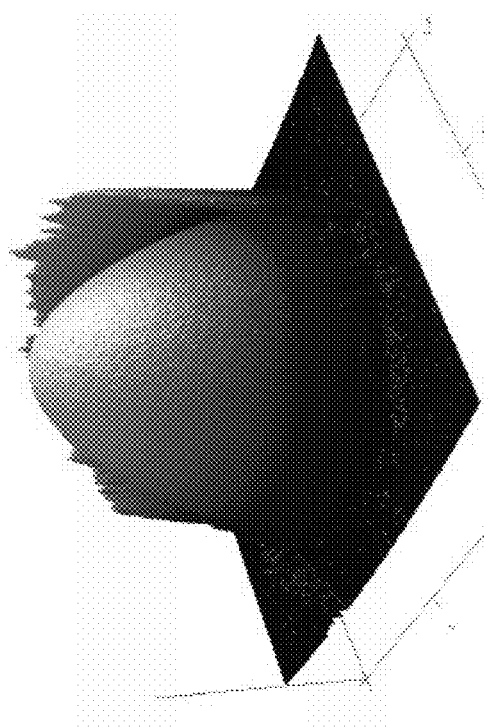
FIG. 4B is an atomic force microscope (AFM) scan of a single cylinder in the patterned metasurface O-PCM SLM of FIG. 4A after annealing.
Figure 4A:
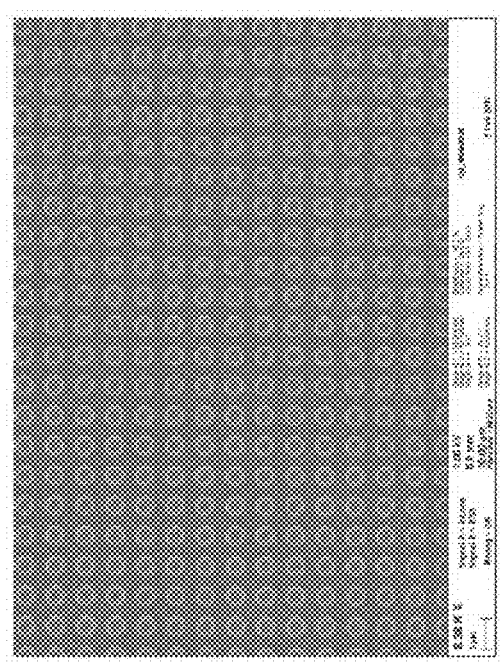
FIG. 4A is a scanning electron microscope (SEM) image of the patterned metasurface O-PCM spatial light modulator (SLM).

An O-PCM SLM can be actuated thermally, optically, or electrically. FIGS. 4A-4E illustrate an SLM with an O-PCM layer that is patterned to form a metasurface and thermally switched. FIG. 4A is a scanning electron microscope (SEM) image of the O-PCM metasurface, which is a two-dimensional (2D) array of 150 nm thick dielectric cylindrical cavities with lithographically defined resonances from 2-5 microns. The 2D metasurface was patterned via electron beam lithography and a subsequent lift-off process. Due to the lift-off process, one side of the cylinders appears to have an edge artifact, as shown in the atomic force microscope (AFM) scan in FIG. 4B. The crystalline form of the metasurface also reflowed during the annealing process at 350° C. for 30 minutes, as also seen in the AFM scan. Finite difference time-domain (FDTD) simulations show that the reflow has a minor effect on the resonance effect. However, an edge artifact can change the measured properties significantly.

Figure 4E:
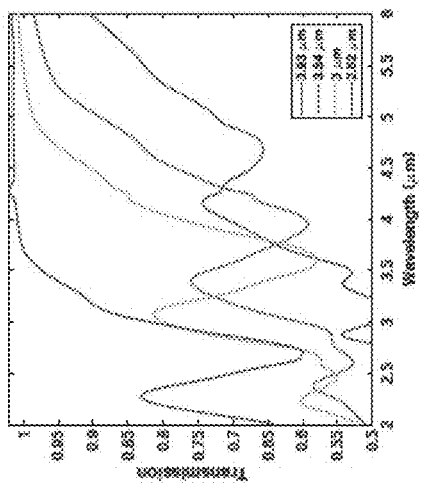
FIG. 4E is a transmission spectrum of a 150 nm thick, patterned metasurface O-PCM SLM in the crystalline state, with each trace representing a different metasurface period.
Figure 4D:
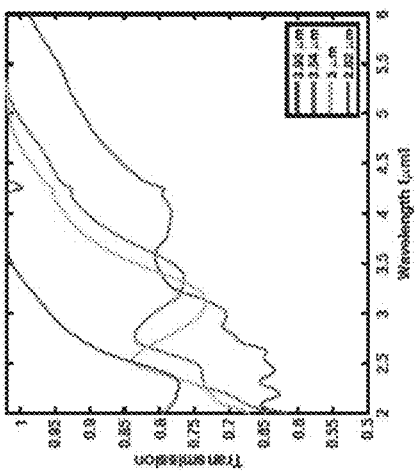
FIG. 4D is a transmission spectrum of a 150 nm thick, patterned metasurface O-PCM SLM in the amorphous state, with each trace representing a different metasurface period.
Figure 4C:
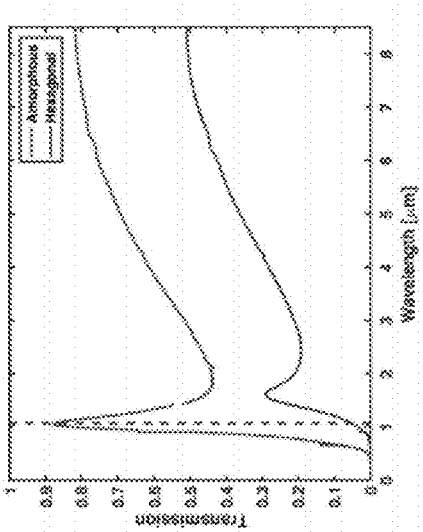
FIG. 4C is a transmission spectrum for an SLM with a uniform 150 nm thick O-PCM layer.

FIGS. 4C-4E show transmission spectra of thermally switched O-PCM SLMs with and without patterned metasurfaces. Each device was thermally switched by annealing at 350° C. for 30 minutes. For comparison, FIG. 4C shows the transmission spectra for a uniform (unpatterned) 150 nm thick O-PCM layer in an amorphous state (upper trace) and a hexagonal crystalline state (lower trace). The resonance in FIG. 4C at 1064 nm is shown with a peak transmission of 88% in the amorphous state and a transmission of 5% in the crystalline state, which equates to a switching contrast of 12.4 dB.

FIGS. 4D and 4E illustrate transmission spectra for SLMs with 150 nm thick O-PCM layers patterned with cylinders arrayed at different pitches, with each pitch corresponding to a different period. FIG. 4D shows the measured transmission of these devices in the amorphous state. FIG. 4E shows the measured transmission of the crystalline state of the metasurface design where the resonances are deeper in the MWIR. The measured peak switching contrast from 84% to 54% (1.9 dB) occurs at a wavelength of 3.96 μm via furnace annealing. The wavelength of this resonance can be tuned by simply changing the period of the cylinder array.

The thickness of the O-PCM film in FIGS. 4D and 4E is less than fifteen times the resonance wavelength, which illustrates the ultra-thin properties of the metasurface O-PCM SLM. The measured resonance dip is not as deep as the simulation suggests, which can be attributed to fabrication errors, including the edge effect observed in the AFM scan in FIG. 4B, and to the use of a Schwarzchild lens for the transmission measurements.

Optical Switching of O-PCM SLMs

Optical switching is fast and flexible, especially for switching large O-PCM pixels or arrays of pixels. Generally, an O-PCM is switched with visible light (400-800 nm) to produce infrared modulation. Amorphization occurs in response to an optical pulse with a duration of about 1 μs or less, whereas crystallization occurs in response to an optical pulse with a duration of about 1 ms. Time-dependent optical switching measurements of GSST-based SLMs demonstrate a record-setting reversible and polarization-independent transmission switch from 95.7% to 19.4% (7 dB), a wide incident angle from 0-60 degrees, and a fastest measured switching speed of 4 ns. And as discussed further below, optical switching enables somewhat arbitrary spatial modulation profiles to be programmed into an O-PCM SLM.

Figure 5A:
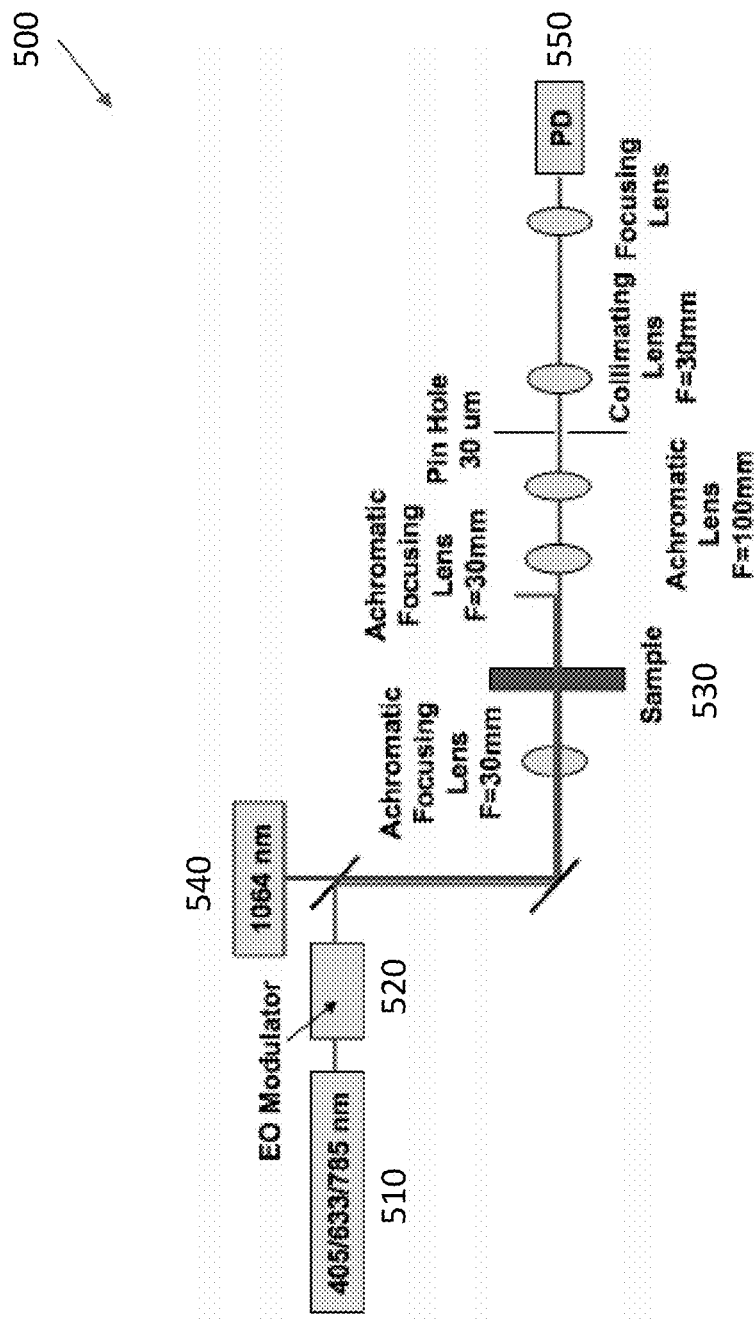
FIG. 5A shows a set up for optically switching and measuring a GSS4T1 SLM.

FIG. 5A shows a pump-probe setup 500 for optical switching and transient transmission measurements. The setup 500 includes a three-laser, continuous-wave (CW) pump source 510 that emits light at wavelengths of 405 nm, 633 nm, and 785 nm, which are wavelengths absorbed by GSS4T1 and other GSST alloys. An electro-optical modulator 520 with a response time of 2 ns controls the (temporal) pulse profile of the pump beam emitted by the pump source 510. The pump beam illuminates an O-PCM SLM 530, thereby switching a layer made of GSS4T1 or another O-PCM between an amorphous state and a crystalline state. This state change causes the O-PCM SLM 530 to modulate the phase, amplitude, or phase and amplitude of a probe beam emitted by a solid-state CW 1064 nm wavelength laser 540. A photodetector 550 senses both the pump beam and the probe beam transmitted by the O-PCM SLM 530.

The O-PCM SLM exhibits two operating regimes for optical switching depending on the power and pulse duration of the pump beam: a first regime in which the pump beam heats the O-PCM to a temperature below the O-PCM's switching (phase change) temperature and a second regime in which the pump beam heats the O-PCM to a temperature above the O-PCM's switching temperature. In the first regime, the O-PCM exhibits an analog "self-reversing" switching behavior due to its thermo-optical properties. And in the second regime, the O-PCM is bi-stable: once switched to a state, it remains in that state until switched again. An O-PCM can also be switched partway between fully amorphous and fully crystalline states (it can be partially amorphous and partially crystalline) to provide analog control.

Figure 5C:
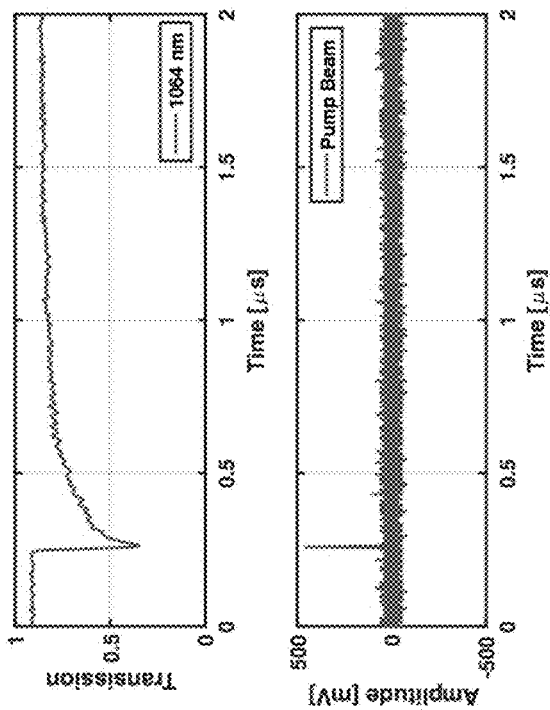
FIG. 5C shows transmission (upper plot) and pump beam amplitude (lower plot) for fast switching of the optically switched GSS4T1 modulator in FIG. 5A.
Figure 5B:
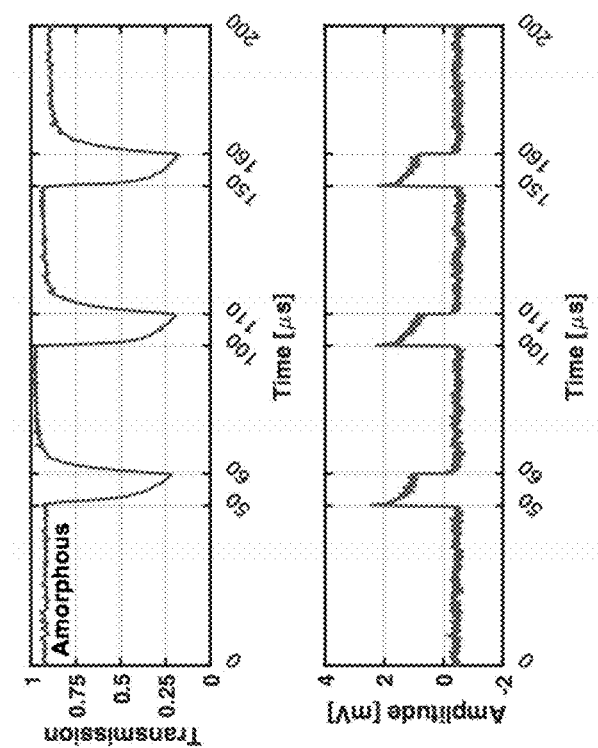
FIG. 5B shows transmission (upper plot) and pump beam amplitude (lower plot) for slow switching of the optically switched GSS4T1 modulator in FIG. 5A.

FIGS. 5B and 5C shows plots of time-dependent, pump-probe transmission switching measurements of the first regime with a Fabry-Pérot O-PCM device using the setup 500 in FIG. 5A. The pump beam included spectral components at 405 nm, 633 nm, and 785 nm with a total power of 136 mW and was focused to spot on the O-PCM device with a diameter of 10 The plots in FIG. 5B shows that a 54 mW 1064 nm probe beam switches on average from 95.7% to 19.4% (7 dB) via a 10 μs pump pulse. FIG. 5C shows measurements of the same O-PCM device switched with a 4 ns laser and takes about 700 ns to cool back to the initial state. The upper plots in FIGS. 5B and 5C show that O-PCM device relaxes back to its initial state with an asymmetry that depends, at least in part, on the laser pulse width and the thermal cooling rate. The cooling rate can be tuned by adjusting the layers around the O-PCM.

In the second operating regime—the more commonplace bi-stable regime—the O-PCM is heated above its phase transition point. In order to characterize the phase change material optical properties, silicon photonic based metrology techniques were used to determine the loss of the phase change materials.

Figure 6B:
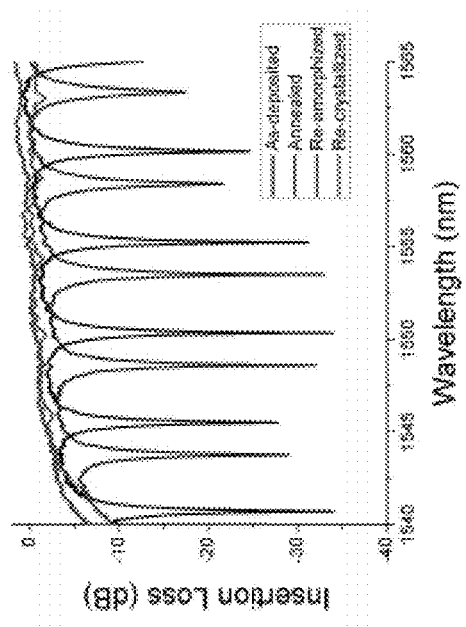
FIG. 6B is a plot of insertion loss versus wavelength for the ring resonator in FIG. 5A before the PCM was annealed, after the PCM was annealed, after the PCM was optically switched back to an amorphous state, and after the PCM was optically switched back to a crystalline state.
Figure 6A:
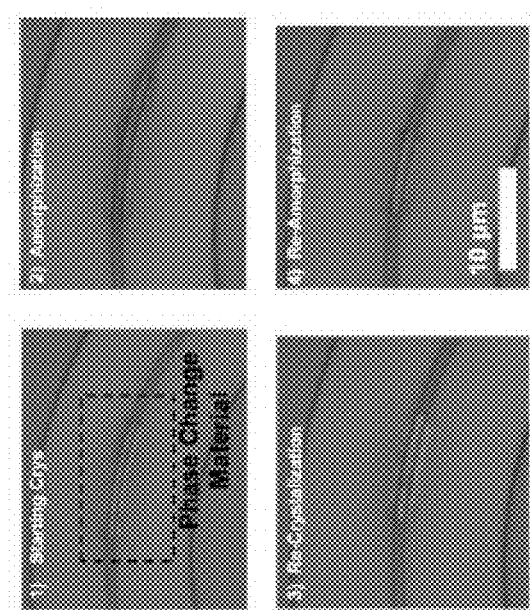
FIG. 6A shows optical microscope images of a ring resonator with a phase change material (PCM; e.g., GSS4T1) that is optically switched between crystalline and amorphous states.

FIGS. 6A and 6B illustrate behavior of optically switched O-PCM in the second regime. FIG. 6A shows optical microscope images of a patch of O-PCM on a SiN ring resonator. Even in the visible spectra, the two states are discernable with the O-PCM appearing lighter in the crystalline state than in amorphous state. The O-PCM was switched from the crystalline state to amorphous state with light from a 633 nm continuous-wave laser and a 780 nm continuous-wave laser with a total optical power of 136 mW. An acoustic optical modulator with a 2 ns rise time was used to modulate the laser outputs to generate optical pulse trains. For amorphous to crystallization phase transitions, a pulse train with period of 1 μs, duty cycle of 0.03% (30 ns), and 100,000 repetitions was used. For crystalline to amorphous phase transitions, a single pulse with a width of 100 ns was used. Other switching cycles are also possible.

FIG. 6B shows the transmission of near-infrared (NIR) light through the ring resonator structure of FIG. 6A as it is optically switched back and for the between amorphous and crystalline states. When the phase change material is in the amorphous state, a transmission dip corresponding to the ring resonance is observed. When the phase change material is in the crystalline state, broadband transmission occurs.

Reconfigurable Infrared Flat Optics with Phase Change Materials

Spatially modulating the pump beam used to switch an O-PCM SLM makes it possible to program the O-PCM SLM with a particular spatial phase or amplitude modulation. If the pump beam is at one or more visible wavelengths, where conventional SLMs are readily available, it can program an O-PCM SLM with a spatial modulation that can be imparted onto an infrared beam. Because the pump beam is at shorter (visible) wavelengths than the modulated (IR) beam, the pump beam can program the O-PCM SLM with sub-wavelength features, making it possible to program a metasurface with a refractive index contrast of 1.0 or more into the O-PCM SLM. In this way, the O-PCM SLM can act as a visible-to-infrared spatial modulation transducer.

This flexibility means that an optically programmed O-PCM SLM is a solid-state, reconfigurable, flat optical component that can be arbitrarily re-configured to any other optical element. For example, it can be configured as an IR lens with different focal lengths without any moving parts. Essentially, any diffractive optical element can be arbitrarily created or erased, enabling a wide variety of reconfigurable infrared photonics thanks to the O-PCM's ability to change its optical properties at a fine two-dimensional spatial resolution.

Figures 7A, 7B, 7C:
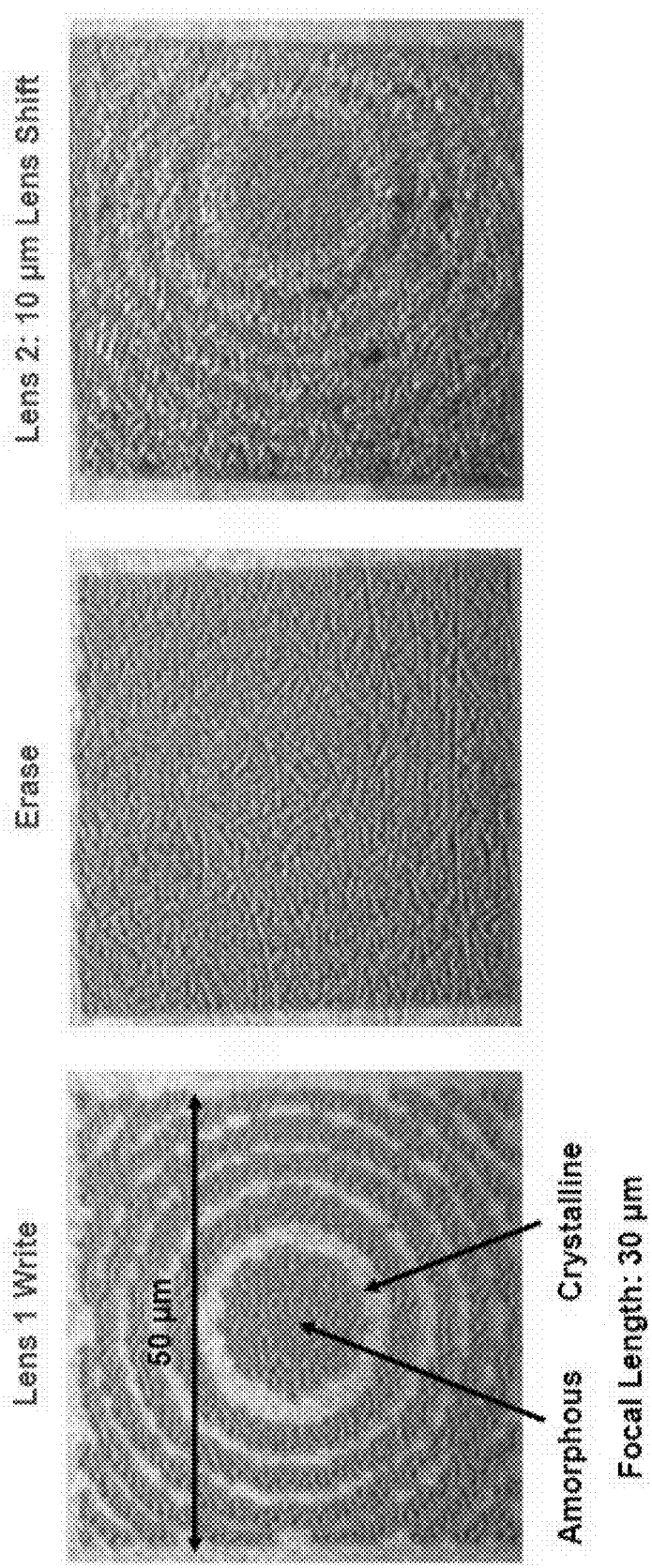
FIGS. 7A-7C illustrate writing, erasing, and re-writing a PCM modulator with a spatially modulated pump beam to produce an optically rewritable lens.

FIGS. 7A-7C and 8A-8C show an experimental demonstration of a rewritable O-PCM lens for the beam steering of a 1064 nm wavelength laser. The lens was formed by using a laser scanning stage to optically write a Fresnel zone plate, as shown in FIG. 7A, into a layer of GSS4T1. This can be done by scanning a focused pump beam across the O-PCM with a three-axis motorized stage with a 500 nm spatial resolution in the X/Y/Z direction. The pump beam can also be scanned or spatial modulated with a scanning mirror or other beam-steering element to switch some regions of the GSS4T1 from amorphous to crystalline (or vice versa) while leaving other areas unswitched.

The stage was controlled with a Labview program that coordinated the stage motion with the laser pulse controller for fully automated 2D laser-based switching. The Labview program can accept an image file and transfer it to the phase change material. It can write just about any diffractive optical element, depending on the image file and the precision of the stage and spot size of the focused pump beam.

FIGS. 7A-7C shows the programmed O-PCM SLM. In FIG. 7A, the GSS4T1 layer is written with a Fresnel lens with a diameter of about 50 μm. The dark regions of GSS4T1 layer are in the amorphous phase and the light regions are in the crystalline phase to provide a refractive index difference of over 1.0. FIG. 7B shows the GSS4T1 layer after being "erased" with a pump beam of uniform intensity. And FIG. 7C shows the GSS4T1 layer after been programmed with Fresnel lens shifted or displaced laterally by about 10 μm.

Figures 8A, 8B, 8C:
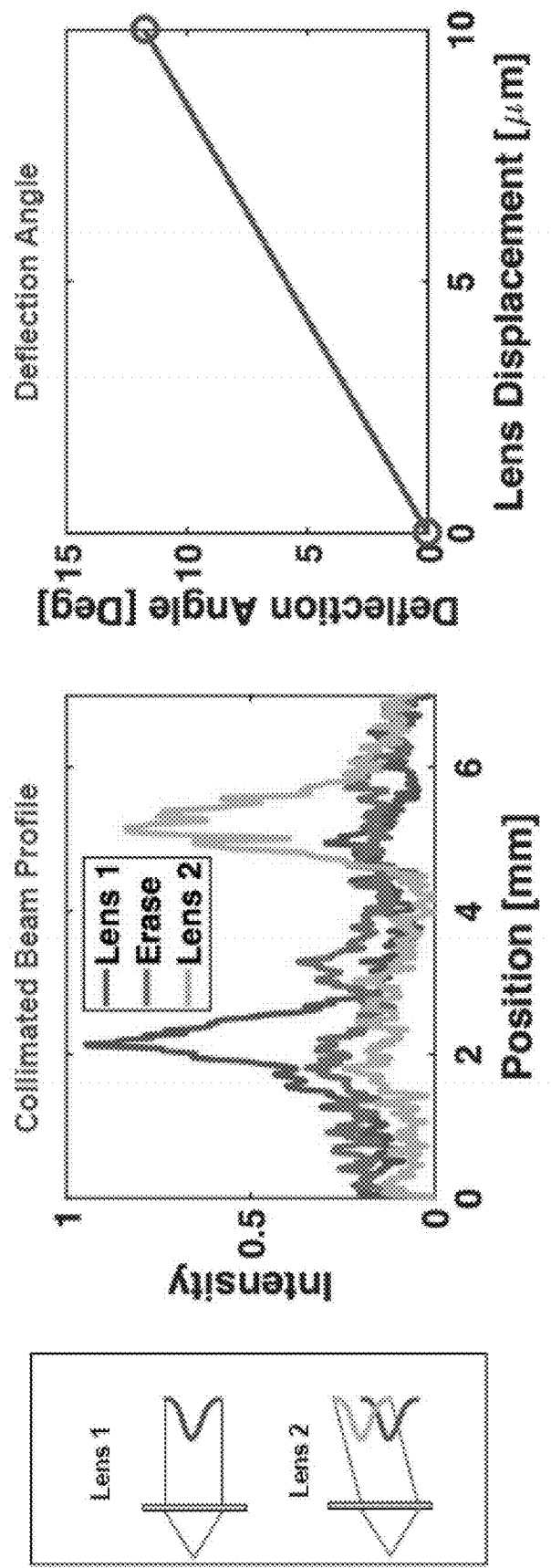
FIG. 8A illustrates beam steering with the optically rewritable lens of FIGS. 7A-7C.
FIG. 8B is a plot of the collimated beam profile produced with the optically rewritable lens of FIGS. 7A-7C.
FIG. 8C is a plot of deflection angle versus lens displacement for the optically rewritable lens of FIGS. 7A-7C.

FIGS. 8A-8C illustrate characterization of the beam steering properties of the patterned GSS4T1 layer in FIGS. 7A-7C. FIG. 8A shows profile views of the unshifted lens in FIG. 7A (top) and the shifted lens in FIG. 7B (bottom). FIG. 8B is a plot of the measured beam profiles of beams from the lens in FIG. 7A, the erased lens in FIG. 7B, and the shifted lens in FIG. 7C. In the erase state of FIG. 7B, no beam is present which demonstrates the efficiency of the writing procedure. FIG. 8C is a plot of the beam deflection angle versus lens displacement, with a calculated beam steering angle of about 12° for a displacement of 10 μm. The maximum achievable beam steering angle can be higher, and the lens can be customized, e.g., to correct for aberrations that occur at wide angles due to spherical aberrations.

Electrical Switching of Transparent Phase Change Materials

O-PCM devices can also be switched electrically, eliminating the use of a separate (visible) laser for switching the O-PCM between amorphous and crystalline states. In an electrically switched O-PCM device, an electrical current heats a layer of conductive material close to (e.g., under) the O-PCM material via Joule heating. This electrical, or, more precisely, electrothermal, switching is reversible. It is also much faster than liquid crystal or MEMS devices—e.g., it can switch the O-PCM at GHz rates despite waiting for heat dissipation between actuations.

FIGS. 9A and 9B show cross-sectional and plan views, respectively, of an electrically switched O-PCM device 900. It includes a layer 920 of O-PCM, such as GSST, sandwiched between a protective layer 910 of magnesium fluoride and a layer 930 of tungsten, which is in turn on a silicon dioxide layer 960 on a silicon substrate 970. For reversible switching, the O-PCM layer 920 should have a thickness of about 200 nm or less; for one-way (crystallization only) switching, the O-PCM layer 920 can be thicker.

An aluminum source contact 930 and aluminum ground contact 940 connect the tungsten layer 920 in series between a power MOSFET 980 and a voltage source Vdd. Running a current between the source contact 930 and ground contact 940 causes the tungsten layer 930 to heat up, which in turn heats the O-PCM layer 920 enough to switch the O-PCM layer 920 between amorphous and crystalline states as explained in greater detail below.

FIG. 9C shows an O-PCM device 902 with a titanium/platinum heater instead of a tungsten heater. In this geometry, the GSS4T1 layer 920 is on a first silicon dioxide layer 922 that is about 10 nm thick. The first silicon dioxide layer 922 helps the GSS4T1 layer 920 stick to a 20 nm thick platinum layer 952, which is on a 50 nm thick titanium layer 954. The platinum layer 952 has a high melting temperature, is CMOS compatible, and does not oxidize. And titanium layer 954 and the silicon dioxide layer 960 help the platinum layer 952 adhere to the silicon substrate 960. The thicknesses of the platinum layer 952 and titanium layer 954 are not critical and can be increased to reduce resistance in order to get a low RC time constant, which enables fast cooling for amorphization.

FIGS. 10A and 10B show a cross-sectional view and perspective SEM images, respectively, of another electrically switched O-PCM device 1000. This device 1000 includes a layer 1020 of O-PCM, such as GSST, on a layer 1030 of aluminum oxide. A layer 1040 of tungsten is sandwiched between the aluminum oxide layer 1030 and a silicon dioxide layer 1050, which is on a silicon substrate 970. The tungsten layer 1040 is connected to a power supply 1010.

Figure 11A:
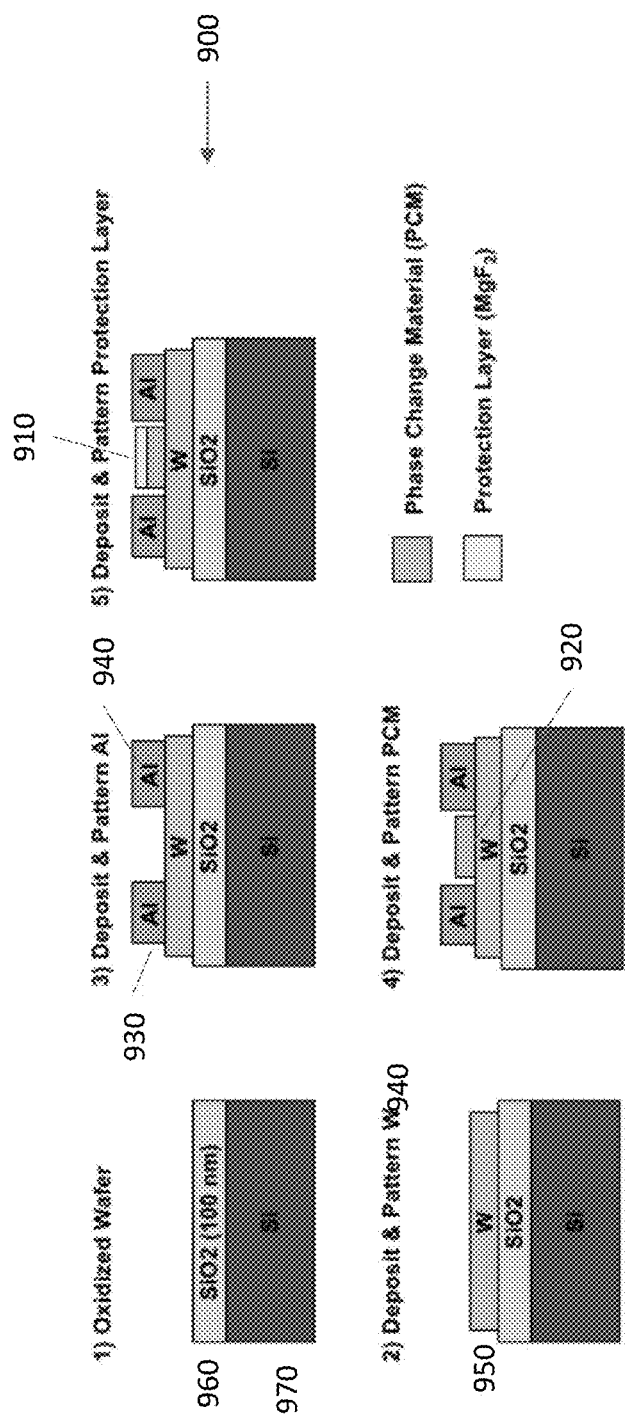
FIG. 11A illustrates a method of making an electrically switched PCM modulator.

FIG. 11A shows a process for making the electrically switched O-PCM device shown in FIG. 9A. In step 1, a silicon wafer 970 is oxidized to provide an electrical isolation layer in the form of a 100 nm thick layer of silicon dioxide 960. Next, in step 2, a 50 nm tungsten layer 920 is deposited, patterned, and etched to form the electrical contact pads and underlying heating element. Tungsten is chosen due to its high melting temperature and high temperature reliability. Aluminum contact pads 930 and 940 that are 200 nm thick are deposited and patterned via lift off in step 3. The thick aluminum contact pads 930 and 940 reduce contact resistance and overall device resistance, except for the phase change square area. Phase change material (e.g., GSST) 920 is then deposited on the tungsten layer 950 between the contact pads 930 and 940 via flash evaporation and patterned via lift off in step 4. And in step 5, a MgF$_2$ protection layer 910 with a thickness of 25 nm is deposited on top of the phase change material 920. This protection layer 910 can be patterned to only exist on top of the phase change material 920, or it can blanket cover the entire device (including the contact pads). The protection layer 910 can be a variety of different materials, such as SiO$_2$ or Al$_2$O$_3$. MgF$_2$ is transparent in the infrared and long wave infrared regions of the electromagnetic spectrum, making it particularly useful for broadband IR SLMs.

Figure 11B:
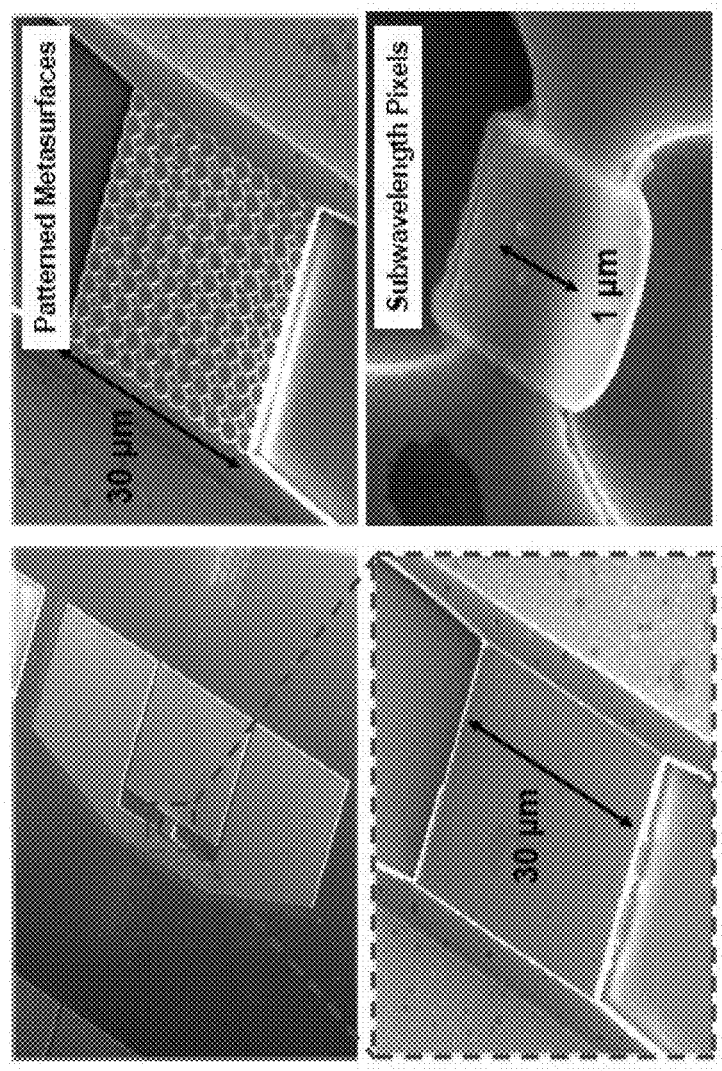
FIG. 11B shows micrographs of PCM modulators with 30 µm×30 µm PCM pixels (left images), 30 µm×30 µm PCM pixels with patterned metasurfaces (upper right), and 1 µm×1 µm PCM pixels (lower right).

FIG. 11B shows SEM images of the O-PCM devices fabricated according to the process shown in FIG. 11A. The upper left image shows the contact pads 930 and 940 and small square of phase change material 920. The lower left image shows a closeup of the 30 μm×30 μm phase change material 920. The phase change material can be pattern, e.g., as in the upper right image, which shows a patterned metamaterial design on a 30 μm×30 μm O-PCM pixel. Lastly, a subwavelength 1 μm×1 μm phase change square area is shown in the lower right image. The O-PCM can be patterned in other shapes and sizes as well.

The O-PCM devices 900 and 1000 can be reversibly, electrothermally switched between reflective states as follows. In each device, heat is applied to the O-PCM material externally via joule heating of a tungsten metal layer in thermal communication contact with the O-PCM material. In the device 900 of FIG. 9A, the tungsten layer 930 is heat by applying a pulse train profile to the device via the gate of the power MOSFET 980. This heating causes the device to switch between high and low reflectivity states. The switching is non-volatile/bi-stable; that is, once the O-PCM is switched to one state, it remains in that state without any applied power until switched back to the other state in response to subsequent actuation. The switching is also asymmetric: amorphization occurs in response to pulse(s) under about 1 microsecond in duration, whereas crystallization occurs in response to pulse(s) under about 1 millisecond in duration. The heat dissipates at a rate depending on the thermal conductivity of the pixel's material stack. Feedback control with an adaptive switching profile can adapt to the (potentially slow) thermal dissipation, e.g., for faster switching.

In addition to non-volatile switching behavior, an O-PCM device can exhibit induced volatile reflectivity modulation based on thermo-optic effect. Since volatile switching involves no phase transition, sub-microsecond bi-directional intensity modulation can be achieved, albeit at a lower contrast that non-volatile switching.

Figure 12:
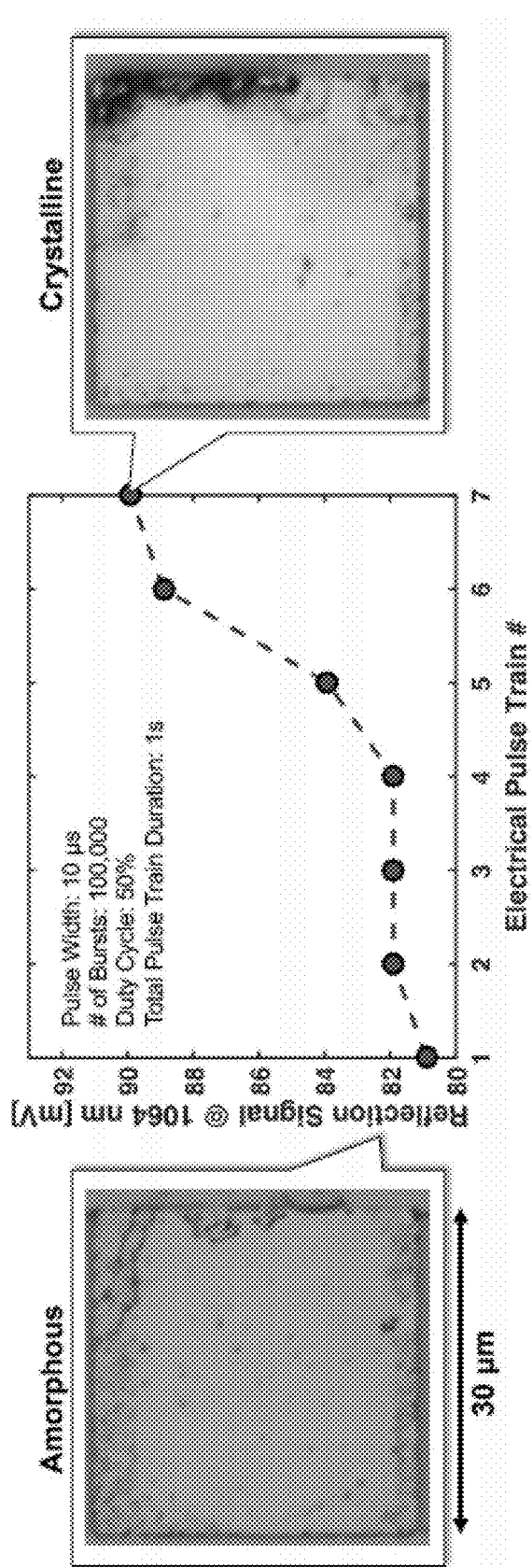
FIG. 12 illustrates reflection versus electrical pulse train number for switching an electrically switched PCM modulator from an amorphous state (left) to a crystalline state (right).

FIG. 12 illustrates electro-optical switching measurements of an O-PCM device like the one shown in FIGS. 9A and 9B. To monitor the state of the material, a 1064 nm laser was focused onto the device, and the reflected light was recorded on a camera with a frame rate of 100 fps as an electrical pulse train was applied to the device. In this case, the electrical pulse train was a burst of 100,000 pulses with a pulse width of 10 μs, a duty cycle of 50%, and a total duration of 1 second. Applying seven pulse trains causes the device's reflectivity to increase from about 81% in the amorphous state (left image) to about 90% in the crystalline state (right image). Further optimization could yield sub-microsecond switching times for both crystallization and amorphization times, enabling Megahertz switching speeds.

Figure 13B:
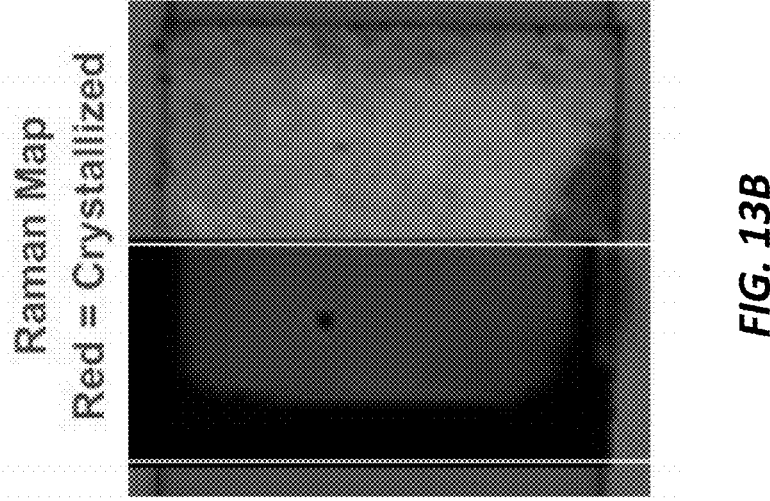
FIG. 13B is a Raman map of an electrically switched PCM modulator in its amorphous (right) and crystalline (left) states.
Figure 13A:
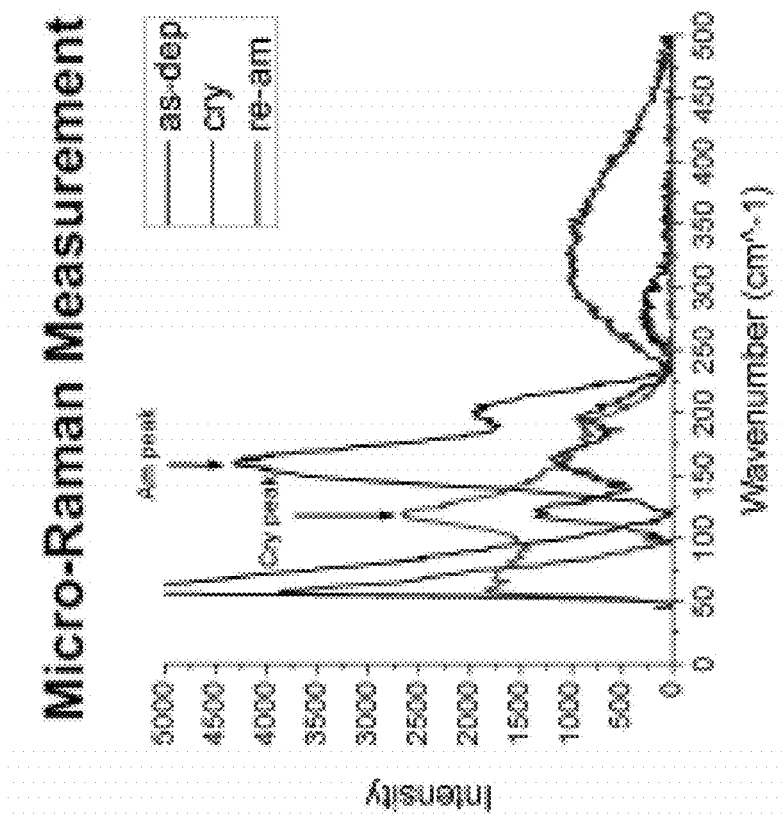
FIG. 13A is a plot of Raman shift for an electrically switched PCM modulator in its amorphous and crystalline states.

FIGS. 13A and 13B are Raman measurements of an electrically switched O-PCM pixel in amorphous and crystalline states. FIG. 13A is a Raman spectrum plot shows that the O-PCM exhibits a pronounced Raman peak that shifts by about 40 cm$^{-1}$, from about 120 cm$^{-1}$ to about 160 cm$^{-1}$. FIG. 13B is a Raman map showing the crystallized O-PCM (left) and the amorphous O-PCM (right).

Figure 14B:
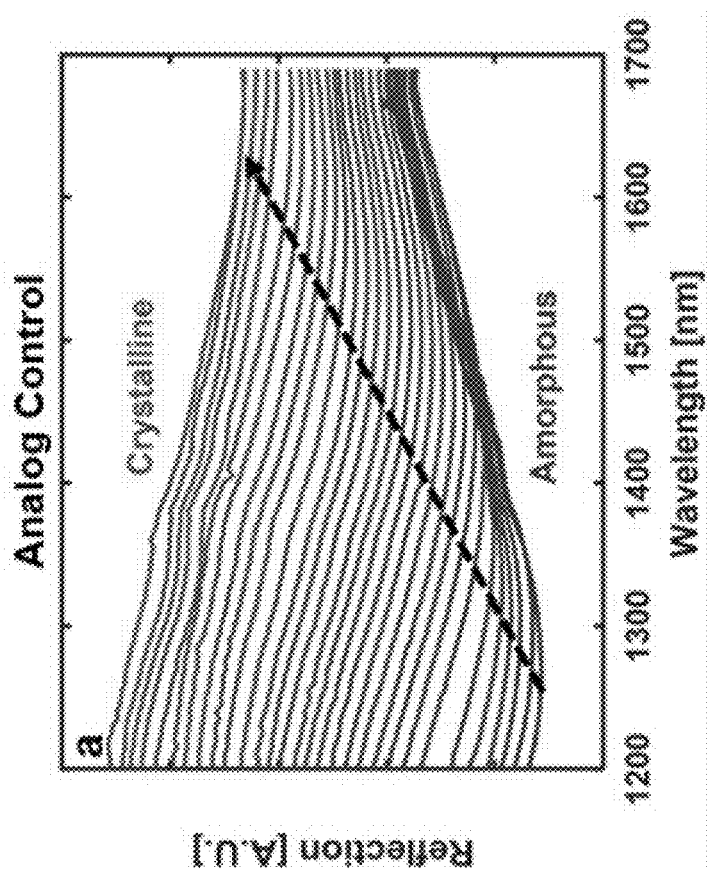
FIG. 14B shows reflection spectra for an electrically switched PCM modulator at different stages between fully amorphous (bottom trace) and fully crystalline (top trace).
Figure 14A:
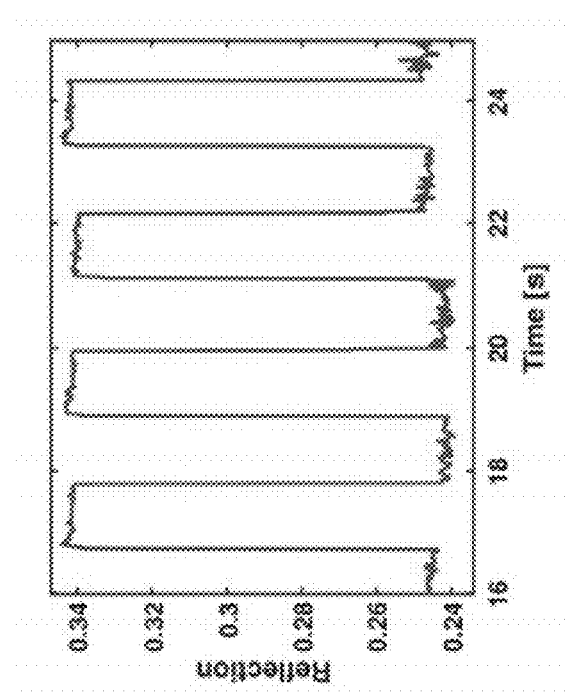
FIG. 14A is a plot of optical reflection versus time for an electrically switched PCM modulator.

FIGS. 14A and 14B illustrate electrical reflection switching of a GSS4T1 device like the one shown in FIGS. 9A and 9B. For the measurements in FIG. 14A, a 1550 run laser was focused onto the device 900, and the reflected light was recorded on an InGaAs video camera with a frame rate of 100 fps as the 30 μm×30 μm O-PCM pixel phase was cycled between amorphous (Am) and Crystalline (Cr) states. Amorphization occurred in response to a single 500 ns pulse at 27 Volts. The GSS4T1 was crystallized with a train of 13.6 V pulses with a period of 1 ms, 50% duty cycle, with a total pulse train duration of 50 ms. The total electrical resistance of the device was 100 W, resulting in a switching energy of 46 mJ and 3.7 µJ for crystallization and amorphization, respectively.

The time-dependent reflection measurement, shown in FIG. 14A, demonstrates an absolute reflection change from 24% to 34%, which corresponds to a relative change in reflection of 41%. The contrast can be further improved with an optimized multilayer film stack design, with simulations predicting contrast of up to 30 dB in the short-wave infrared range.

FIG. 14B shows the measured reflection spectra of the pixel as the GSS4T1 film is slowly switched from a fully amorphous state to a fully crystalline state via electrical pulses. It shows at least 30 achievable intermediate reflection states, with each reflection state corresponding to a different partially crystalline/amorphous state. More intermediates states can be achieved with more precise actuation and real-time feedback control.

Figures 15A, 15B:
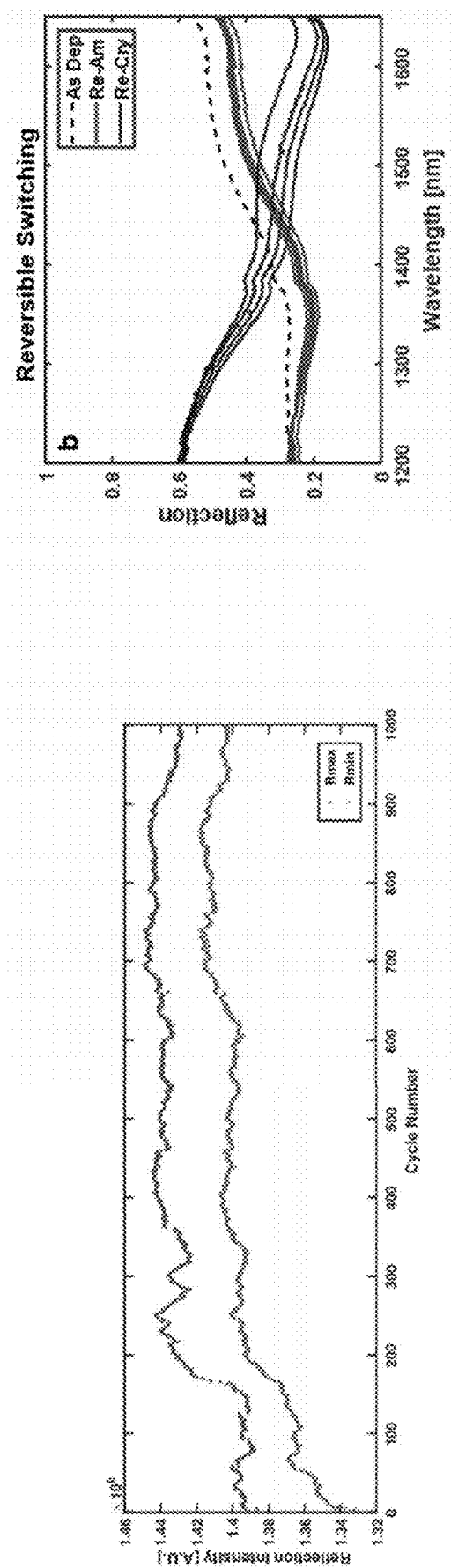
FIG. 15A is a plot of reflectance versus cycle number for many switching cycles of an electrically switched PCM modulator in its amorphous and crystalline states.
FIG. 15B shows reflection spectra for an electrically switched PCM modulator switched many times between its amorphous and crystalline states.

FIGS. 15A and 15B are plots showing the repeatability and reversibility of actuating an O-PCM device with electrical switching. FIG. 15A shows the reflection intensity versus switching cycle number for 1000 switching cycles. The difference in reflectivity between amorphous (lower trace) and crystalline (upper trace) states remains relatively constant as a function of cycle number. FIG. 15B shows reflection spectra for as-deposited (amorphous) O-PCM (dashed line), re-amorphized O-PCM (lower traces, left side), and re-crystallized O-PCM (upper traces, left side). The tight groupings of the reflection spectra indicate good repeatability.

O-PCM Laser Shutter

Figures 16A, 16B:
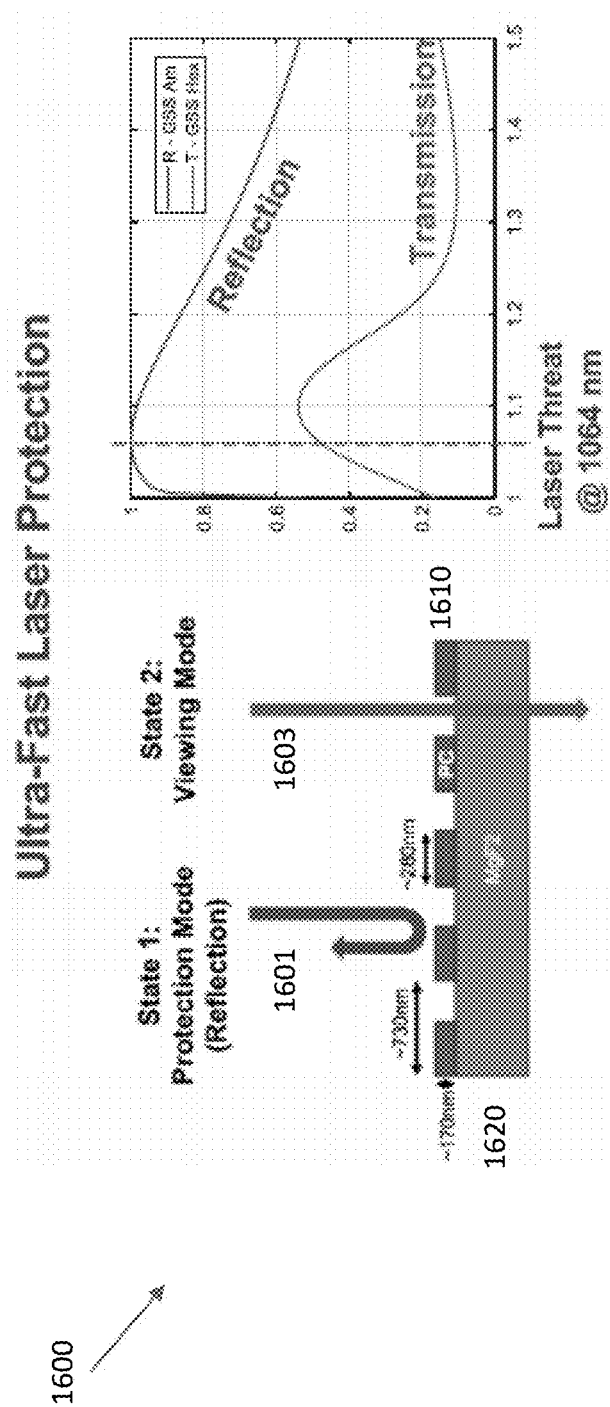
FIG. 16A shows a PCM optical shutter for ultra-fast laser protection.
FIG. 16B is a plot of reflection and transmission for the PCM optical shutter of FIG. 16A.

FIGS. 16A and 16B illustrate an ultra-fast laser shutter 1600 made of O-PCM (e.g., GSS4T1) pixels 1610 on a magnesium fluoride substrate 1620. The O-PCM pixels 1610 are about 170 nm thick, about 280 nm wide, and spaced at a pitch of about 730 nm. The sub-wavelength widths of the pixels 1610 creates an optical profile that provides higher optical contrast than a uniform film. In protection mode, the pixels 1610 are in an amorphous state and reflect incident 1064 nm laser light 1601 with a reflectively of about 1.0. In transmission mode, the pixels 1610 are in a crystalline state, and their reflectivity at 1064 nm falls to about 0.5. The pixels 1610 can be switched optically or electrically as described above.

Electrical, Solid-State Spectrometer with O-PCM for Hyperspectral Imaging

Current hyperspectral imaging schemes require wavelength tunable filters via mechanical push broom windows in combination with a grating, filter wheels, passive dispersion, or multi-layer liquid crystal filter schemes. The mechanical methods typically require bulky moving parts, dispersive elements, and large spatial volumes for the optical path. Filter wheels have limited wavelength channels and throw away a majority of the received light. Liquid crystal filters also require polarization filters which decrease the overall optical efficiency and do not work in the infrared due to absorption. A passive dispersive element can also be employed, but requires an array of pixels, thus not advantageous for imaging applications.

Figure 17A:
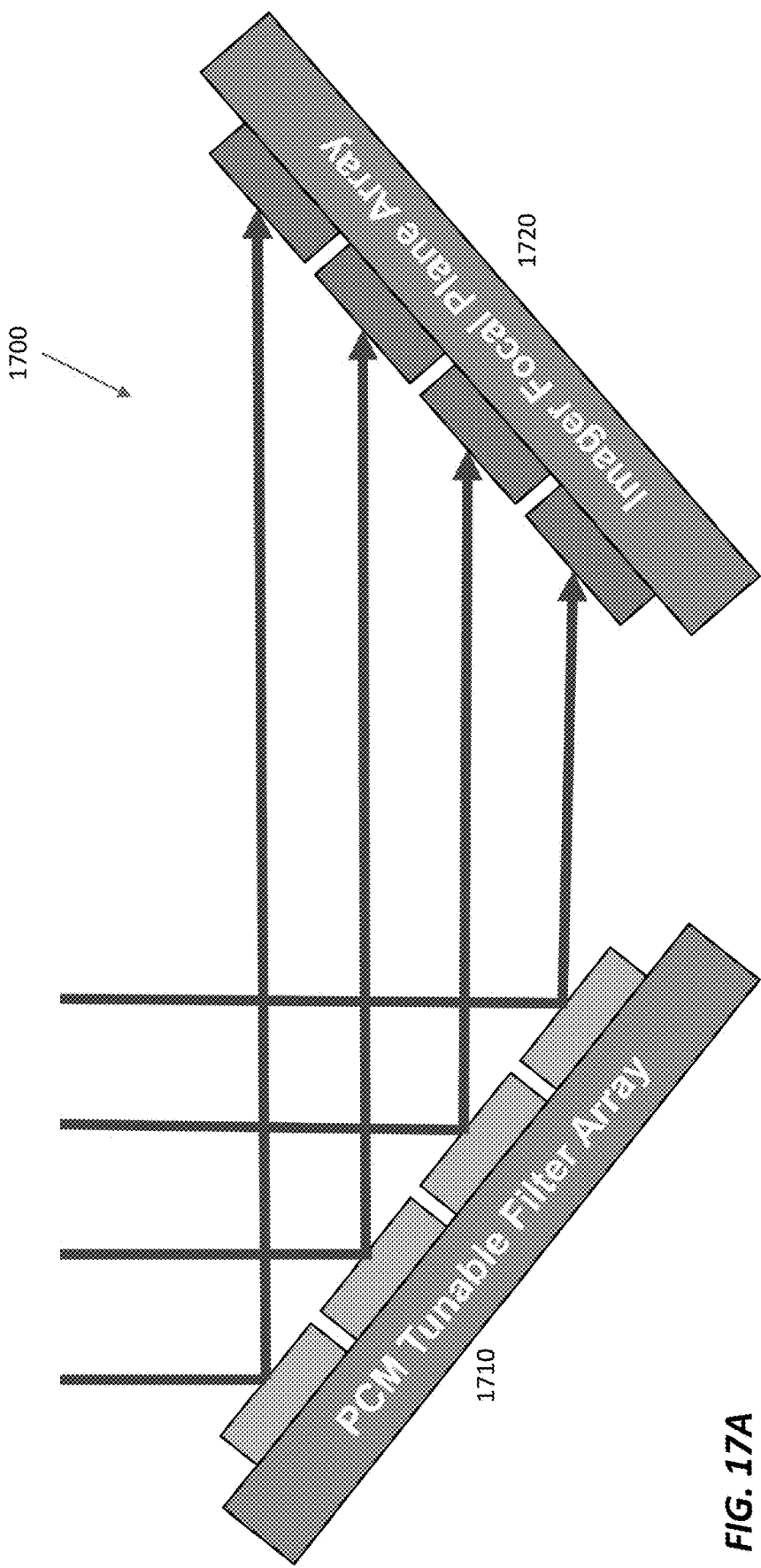
FIG. 17A illustrates a pixel-level hyperspectral imaging system with PCM pixels.

FIG. 17A shows an O-PCM hyperspectral imaging system 1700 that works over large wavelength ranges (1-18 µm) with no moving parts, no polarization filters, and no other optical components.

The system 1700 includes an electrically tunable, O-PCM filter array 1710 with pixels made of low-loss phase change material (e.g., GSS4T1), e.g., like those shown in FIGS. 9A and 10A. Each pixel in the filter array 1710 can be independently to reflect light at different wavelengths to an imager focal plane array (FPA) 1720, which detects the spectrally filtered light from the filter array 1710 to produce a hyperspectral image. Modulating the pixels' wavelength-dependent reflectivity as a function at rate commensurate with the FPA's frame rate yields a hyperspectral data cube.

For spectroscopy applications, the index tunability of the O-PCM is used to shift the reflection minimum across a wavelength range of 1200 nm to 1700 nm. This wavelength shift act as a nonlinear filter which can be used to reconstruct an input spectrum. At a high level, the amplitude of the incident light on a pixel can be approximated by [P]=M[S], where vector [P] is the value of an O-PCM pixel at various filter states, [f] is a two-dimensional (2D) matrix composed of a tunable filter's reflection spectra at various states versus wavelength (e.g., as shown in FIG. 14B), and [S] is the input "real" spectrum as a function of wavelength. If the pixel value P is measured at different filter states, and [f] is known from previous characterizations, a system of linear equations can be solved for [S], where [S]=[P]/[f]. For practical purposes, a best least squares approximation is used.

Figure 17B:
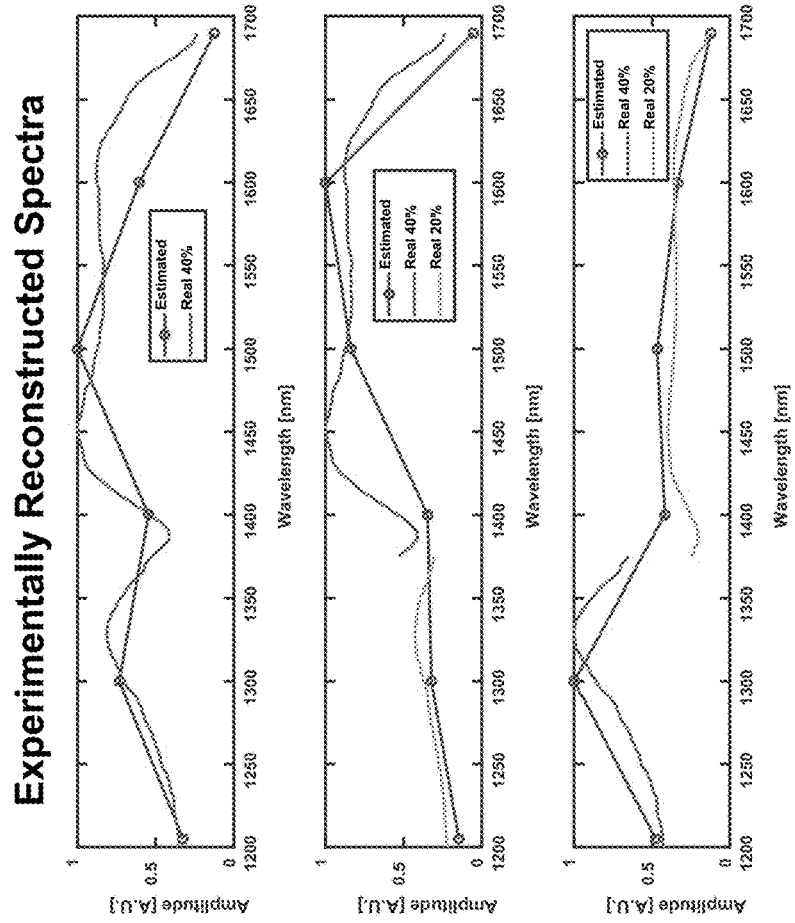
FIG. 17B show experimentally reconstructed hyperspectral imaging data acquired with the pixel-level hyperspectral imaging system of FIG. 17A.

FIG. 17B shows reconstructed spectra from experimental measurements compared to the real input spectra. The selection of which filter states to used was optimized to reduce the overall error. In the end, seven filter states were used to reconstruct the spectra shown in FIG. 17B. The resolution of the reconstruction can be improved with more precise measurements, as well as optimized optical film stacks to further distinguish the filter spectral responses. The reconstructed spectra accurately follow the real spectra over three different input states. The same seven filters were used in all three states, which demonstrates the robustness of the reconstruction process. The input spectra were created with a supercontinuum laser with eight simultaneous outputs from 1200 nm to 1700 nm.

High-Frame-Rate, Multi-Dither Adaptive Optics with O-PCM SLMs

Adaptive optics for high-speed, free-space optical communications is another application that benefits from spatial light modulation with O-PCMs. In a typical fee-space optical communication system, a transceiver on the ground communicates with a transceiver on a moving object, such as a small satellite in low-earth orbit (LEO). Unfortunately, atmospheric aberrations reduce downlink detection efficiency of signals transmitted from a satellite or airborne object by perturbing the wave front of the communications signal beam (the downlink beam). Adaptive optics compensates this turbulence.

Conventional adaptive optics systems are bulky, expensive and complex. A typical conventional adaptive optics system uses a wave front sensor, such as a bulky Shack-Hartmann sensor, to measure undesired perturbation imparted by the atmospheric turbulence. This approach siphons off some of the received signal beam, reducing signal-to-noise ratio (SNR), and requires a high-frame-rate, low-noise focal plane array (FPA). It also relies on slow SLMs with coarse spatial resolution (e.g., MEMS SLMs with kilohertz modulation rates and pixels of about 300 µm by about 300 µm).

Conversely, O-PCM SLMs enable a multi-dither adaptive optics system can operate with a higher SNR because it does not pick off any portion of the downlink beam for wave front analysis. Instead, it delivers all the power in the downlink beam to a fiber amplifier for amplification and detection, with a feedback controller adjusting the O-PCM SLM to provide fast wave front correction that maximizes the detected power. This results in a fundamentally higher SNR than is achievable with an adaptive optics system that uses a separate wave front sensor to measure the undesired perturbation.

Figure 18:
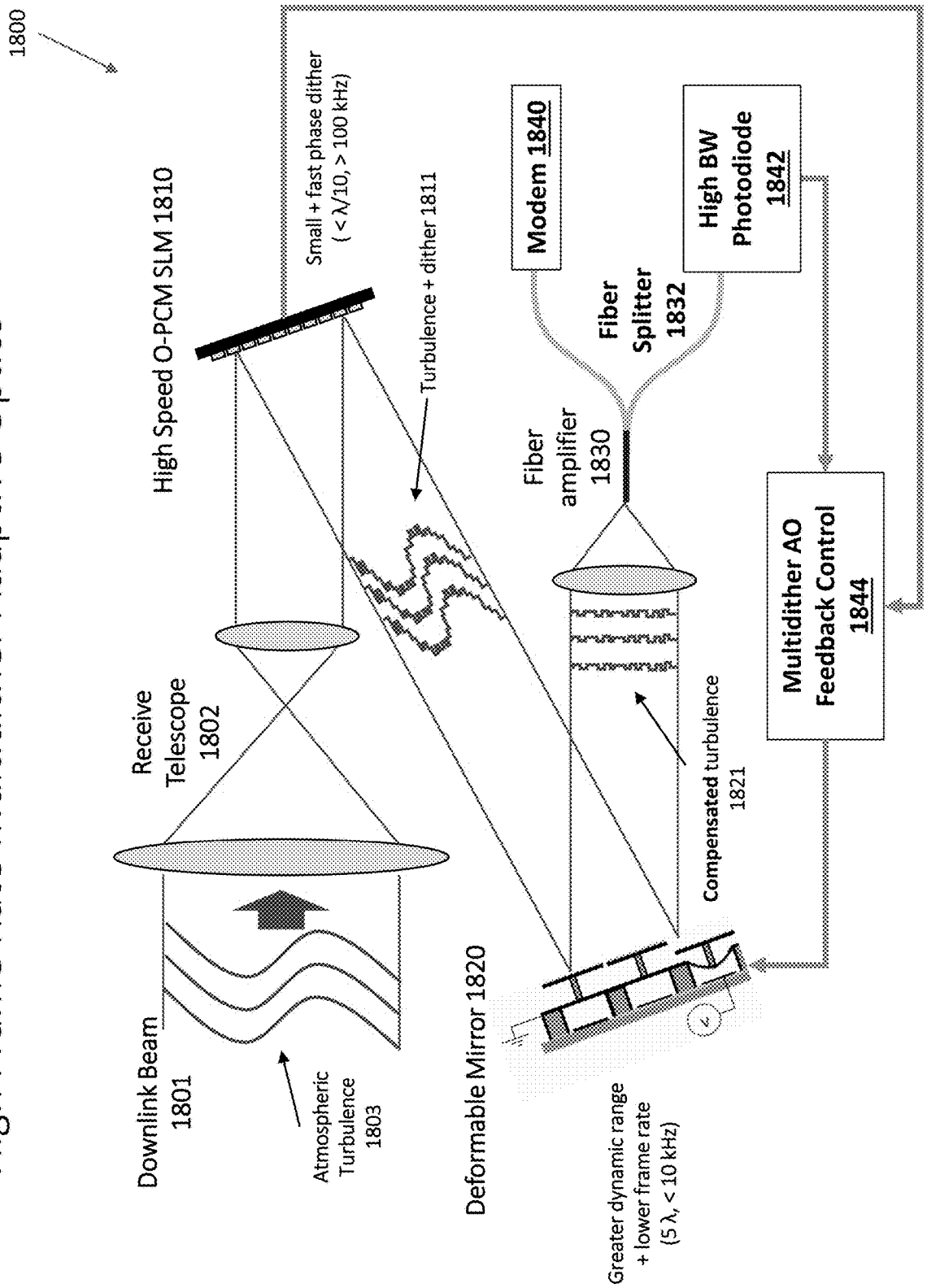
FIG. 18 shows a high-frame-rate, multi-dither adaptive optics system with an O-PCM SLM.

FIG. 18 shows an example multi-dither adaptive optics system 1800. The system 1800 includes a telescope 1802 that receives a downlink beam 1801, which may be corrupted by atmospheric turbulence 1803, from a satellite or other transmitter. An O-PCM SLM 1810 modulates the received beam with a small, fast phase dither with fine spatial resolution (e.g., a phase dither $<\lambda/10$ at a rate of 100 kHz, 1 MHz, 10 MHz, 100 MHz, or faster and a pixel size of about 100 nm). The modulated beam 1811 is perturbed with a phase-dithered version of the turbulence and reflects off a conventional MEMS deformable mirror 1820, which modulates the beam's phase at a larger dynamic range (e.g., $\leq 5\lambda$) at a lower frame rate (<10 kHz) to produce a beam 1821 compensated for turbulence and encoded with the phase dither from the O-PCM SLM 1802. All of the compensated beam 1821 is coupled into a fiber amplifier 1821, which amplifies the compensated beam 1821. A fiber splitter 1832 directs a first portion of the amplified beam to a modem 1840 for communications and a second portion of the amplified beam to a high-bandwidth (BW) photodiode 1842.

A feedback controller 1844 senses the dither signal in the electrical signal from the photodiode 1842 and uses it to control the modulation applied by the deformable mirror 1820. The feedback controller 1844 may implement self-optimized machine learning based control, e.g., using a computationally simple and efficient gradient descent algorithm that maximizes the power detected by the photodiode 1842. This eliminates the need to split the downlink beam 1801 to measure wave front error, increasing the SNR for a given downlink irradiance and reducing the system's size, cost and complexity by eliminating the wave front sensor optics and infrared camera.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

The foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spatial light modulator (SLM) comprising:
   a resistive layer;
   a GeSbSeTe (GSST) element, in thermal communication with the resistive layer, having a refractive index and/or an absorption that varies reversibly with temperature;
   a pair of electrodes, in electrical communication with the resistive layer, to apply a current pulse to the resistive layer, the current pulse causing the resistive layer to heat the GSST element
   a silicon substrate;
   a first silicon dioxide layer disposed on the silicon substrate, the resistive layer disposed on the first silicon dioxide layer;
   a second silicon dioxide layer disposed on the resistive layer, the GSST element disposed on the second silicon dioxide layer; and
   a magnesium fluoride layer disposed on the GSST element.

2. The SLM of claim 1, wherein the GSST element has a thickness selected to produce a change in refractive index in response to heating by the resistive layer.

3. The SLM of claim 1, wherein the GSST element has a thickness selected to produce a change in absorption in response to heating by the resistive layer.

4. The SLM of claim 1, wherein the GSST element changes at least partially from a crystalline state to an amorphous state in response to heating by the resistive layer.

5. The SLM of claim 1, wherein the GSST element is a first GSST element in an array of GSST elements, each of which is in thermal communication with a corresponding portion of the resistive layer.

6. The SLM of claim 5, wherein the resistive layer is patterned to thermally isolate the corresponding portions of the resistive layer.

7. The SLM of claim 5, wherein the first GSST element has a first thickness and the array of GSST elements comprises a second GSST element having a second thickness different than the first thickness.

8. The SLM of claim 1, further comprising:
   a transistor, in electrical communication with one electrode in the pair of electrodes, to provide the current pulse to the pair of electrodes.

9. The SLM of claim 1, further comprising:
   a focal plane array, in optical communication with the GSST element, to detect light modulated by the GSST element; and
   a controller, operably coupled to the focal plane array, to modulate the current pulse based on the light detected by the focal plane array.

10. The SLM of claim 9, wherein the controller is configured to modulate the current pulse at a rate of at least 1 kHz and the GSST element is configured to produce a phase shift of up to about $\lambda/10$, where $\lambda$ is a wavelength of light incident on the GSST element.

11. A method of spatially modulating infrared light with a spatial light modulator (SLM) comprising:
    a resistive element in thermal communication with a GeSbSeTe (GSST) element having a refractive index and/or an absorption that varies reversibly with temperature; and
    a pair of electrodes in electrical communication with the resistive layer;
    a silicon substrate;
    a first silicon dioxide layer disposed on the silicon substrate, the resistive element disposed on the first silicon dioxide layer;
    a second silicon dioxide layer disposed on the resistive element, the GSST element disposed on the second silicon dioxide layer; and
    a magnesium fluoride layer disposed on the GSST element, the method comprising:
    applying a current pulse with the pair of electrodes to the resistive element so as to heat the GSST element with the resistive element, thereby changing a refractive index and/or an absorption of the GSST element; and
    transmitting the infrared light through the GSST element, thereby changing a phase and/or an intensity of the infrared light.

12. The method of claim 11, wherein applying the current pulse causes the GSST element to transition between an amorphous state and a crystalline state.

13. The SLM of claim 1, wherein the GSST element is $Ge_2Sb_2Se_4Te$.

14. The SLM of claim 1, wherein the resistive layer comprises at least one of tungsten, titanium, or platinum.

15. The SLM of claim 14, wherein the resistive layer comprises tungsten.

16. The SLM of claim 14, wherein the resistive layer comprises tungsten and platinum.

17. The SLM of claim 1,
    wherein the magnesium fluoride layer has a thickness of about 20 nm to about 85 nm.

18. The SLM of claim 17, wherein the magnesium fluoride layer has a thickness of about 20 nm.

19. The SLM of claim 1, wherein the GSST element has a thickness of about 5 nm to about 200 nm.

20. The SLM of claim 1, wherein the GSST element is a first GSST element with a refractive index that varies reversibly with temperature, and further comprising:
    a second GSST element in optical communication with the first GSST element and having an absorption that varies reversibly with temperature.

* * * * *